(12) United States Patent
Arnold et al.

(10) Patent No.: US 7,410,581 B2
(45) Date of Patent: Aug. 12, 2008

(54) BRANCHED FLOW FILTRATION AND SYSTEM

(75) Inventors: John W. Arnold, Pinehurst, NC (US); Irving D. Elyanow, Lexington, MA (US); William W. Carson, Hopkinton, MA (US)

(73) Assignee: GE Infrastructure, Water & Process Technologies, Watertown, MA (US)

( * ) Notice: Subject to any disclaimer, the term of this patent is extended or adjusted under 35 U.S.C. 154(b) by 220 days.

(21) Appl. No.: 10/494,539

(22) PCT Filed: Nov. 5, 2002

(86) PCT No.: PCT/US02/35352

§ 371 (c)(1),
(2), (4) Date: Sep. 23, 2004

(87) PCT Pub. No.: WO03/039708

PCT Pub. Date: May 15, 2003

(65) Prior Publication Data

US 2005/0029192 A1    Feb. 10, 2005

Related U.S. Application Data

(60) Provisional application No. 60/332,878, filed on Nov. 6, 2001, provisional application No. 60/392,225, filed on Jun. 28, 2002.

(51) Int. Cl.
*B01D 63/12* (2006.01)
*B01D 63/10* (2006.01)
*B01D 63/06* (2006.01)
*B01D 61/00* (2006.01)

(52) U.S. Cl. .................. 210/321.85; 210/650; 210/652; 210/321.76; 210/321.6; 210/321.65

(58) Field of Classification Search ............ None
See application file for complete search history.

(56) References Cited

U.S. PATENT DOCUMENTS 4,046,685 A    9/1977 Bray
4,083,780 A    4/1978 Call
(Continued)

FOREIGN PATENT DOCUMENTS

FR    2126586    10/1972

*Primary Examiner*—Krishnan S Menon
(74) *Attorney, Agent, or Firm*—David Silverstein; Andover-IP-Law

(57) ABSTRACT

A cross flow filtration apparatus for nanofiltration or reverse osmosis has pressure vessels with a plurality of filter cartridges in each vessel. A feed port is provided at an intermediate position on the side of the vessel, and two permeate flows or branches exit opposite ends of the vessel, and the first branch has a characteristically high "upstream" flux and quality, while the second is of lesser flux and/or quality. The system provides a high degree of moduarity, enhancing flux or yield at a reduced driving pressure or overall pressure drop. Centered or off-center port, and a stop or valve in the permeate stream may apportion flows between the two outlets. Staged systems may employ a first stage bypass to achieve a target quality with increased yield. A flow divider or adaptor permits the cartridges to fit and seal in the vessel and an installation tool or sleeve may facilitate installation or replacement of cartridges having a directional perimeter seal. A tool permits modules to be bi-directional installed in the pressure vessel. Other embodiments involve adapting a conventional vessel designed for end-to-end feed flow utilizing a restrictor, obstruction or valve inside the filter cartridge to bifurcate or otherwise split or apportion the permeate. RO elements may be modified to movably position an obstruction or valve along a string of the elements and vary the take-off to two or more permeate outlets, or to provide pressure relief valves that present different pressure conditions for different elements of a string. A pressure vessel may have an intermediate inlet, with symmetric or asymmetric branching of permeate flow to opposed ends of the vessel, enhancing permeate flux, permeate quality and/or energy efficiency.

51 Claims, 13 Drawing Sheets

U.S. PATENT DOCUMENTS

| | | |
|---|---|---|
| 4,293,419 A | 10/1981 | Sekino et al. |
| 4,409,849 A | 10/1983 | Roos |
| 4,548,714 A | 10/1985 | Kirwan et al. |
| 4,746,430 A | 5/1988 | Cooley |
| 4,906,372 A | 3/1990 | Hopkins |
| 5,470,468 A | 11/1995 | Colby |
| 5,851,267 A | 12/1998 | Schwartz |
| 5,992,643 A | 11/1999 | Scrogham et al. |
| 6,007,723 A | 12/1999 | Ikada et al. |
| 6,302,448 B1 | 10/2001 | Van Der Meer et al. |

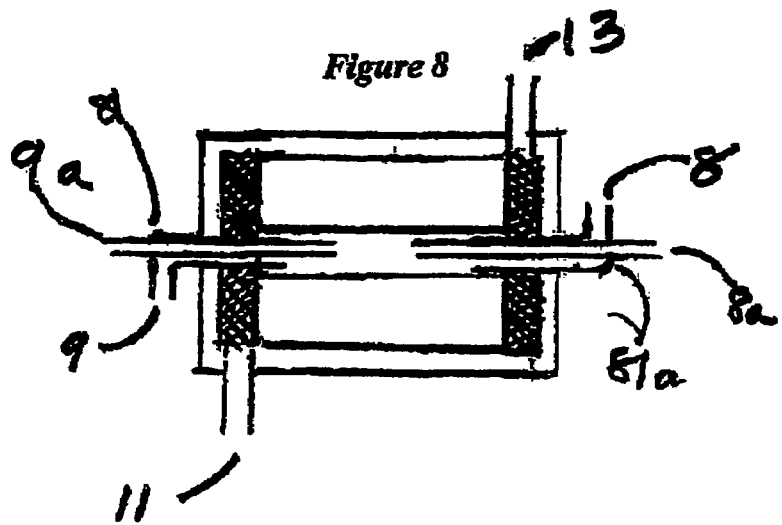
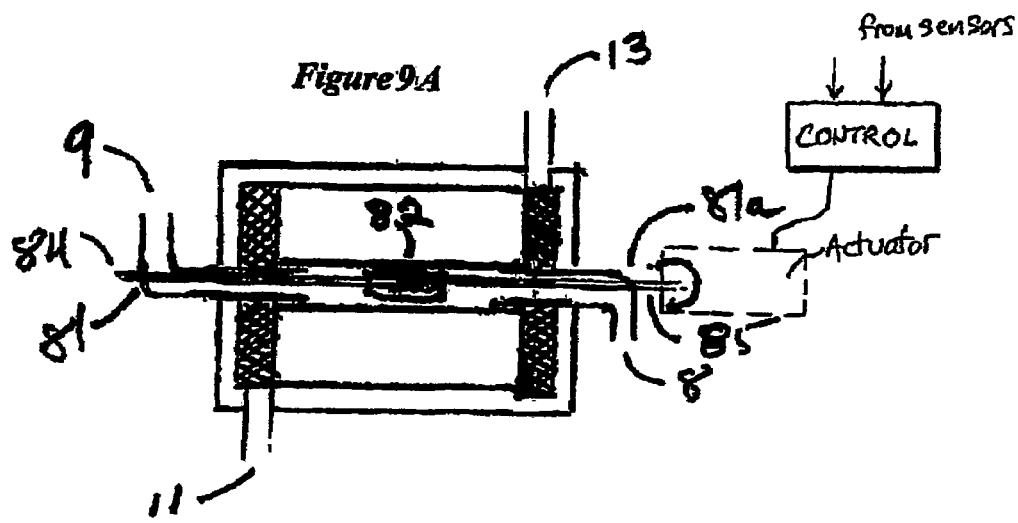
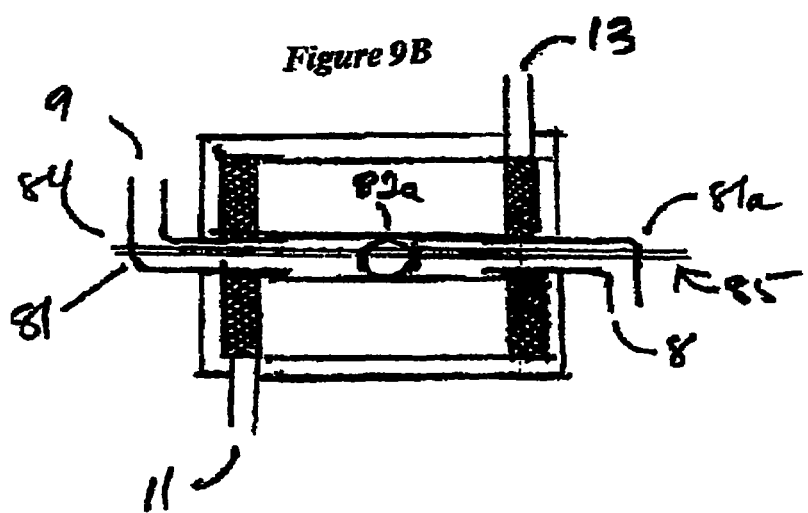

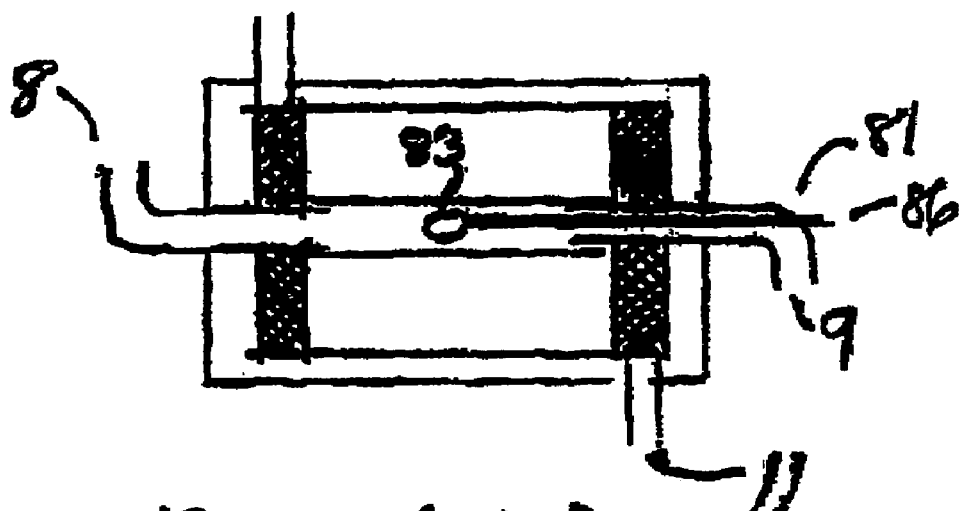
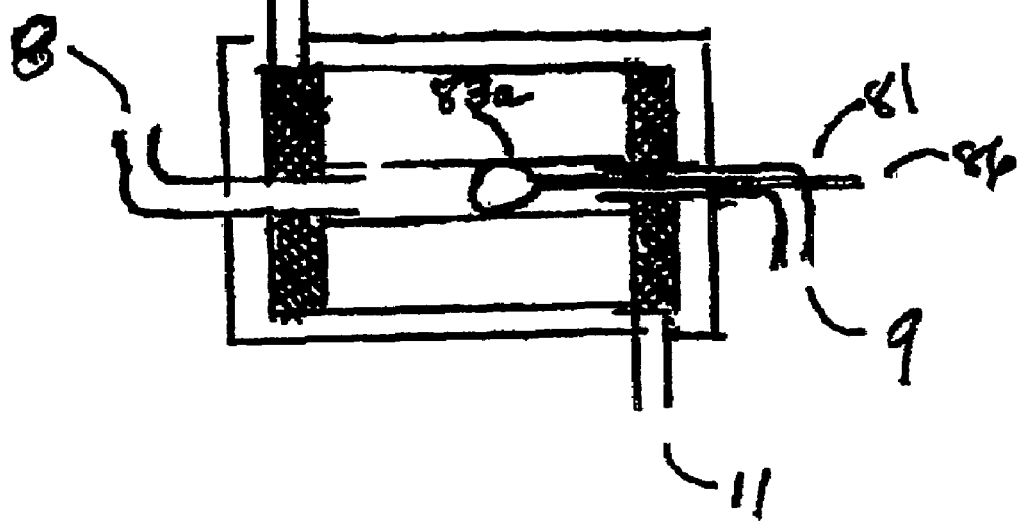

BRANCHED FLOW FILTRATION AND SYSTEM

CROSS REFERENCE TO RELATED APPLICATIONS

This application claims priority to international application PCT/US02/35352, filed Nov. 5, 2002, which in turn claims the benefit of U.S. Application Ser. Nos. 60/332,878 filed Nov. 6, 2001 and 60/392,225 filed Jun. 28, 2002.

This invention pertains to filter elements and vessels, and systems and methods for filtration of fluids, such as water, to achieve a fluid product of a specified quality level. It particularly relates to high flow or cross flow filtration apparatus, such as nanofiltration (NF) or reverse osmosis (RO) wherein the filter modules are typically arranged in a string or series in the feed flow, and wherein the filtrate quality with respect to at least one removable material constituent in the feed stream, and/or wherein the filtrate quantity, varies progressively with position along the path. The filtration apparatus of the invention employs novel filtration elements and/or pressure vessels wherein the filtration elements are placed in series in a pressurized flow vessel, and systems utilizing the apparatus may segregate or apportion permeate from a first or primary set of elements from the permeate of a downstream set of elements. Systems employing vessels or units according to the invention may further treat the downstream permeate (e.g., to decrease the concentration of a species poorly rejected by the filter membranes), and may blend streams to produce a product meeting desired specifications. In these systems, the concentration of a constituent species or other parameter(s) may be monitored and the measurement applied to regulate operation of the system. The invention is thus able, for example, to achieve product stream with low concentration of chemical species that might otherwise be poorly rejected by the membranes and to effect various efficiencies of operation or control.

BACKGROUND OF THE INVENTION

The invention pertains to filtration apparatus for treating fluids, and particularly relates to high volume or high flow treatment plants, such as public drinking water, agricultural water or industrial water treatment plants.

In the modern world, water treatment plants are specified by clients or required by government regulations to have certain maximum concentrations of various chemical species. The equipment and methods used to treat feed waters to achieve specified product water quality may or may not be set forth in detail. Final equipment design and method of operation are usually determined by the system suppliers, e.g., specialized water treatment engineering firms and equipment manufacturers. In many instances a water user accepts a bid for specified product water quality and quantity from a water supplier who is to own and operate the water treatment plant, and the user does not set any specifications on the plant or on the selection of equipment/design. This last arrangement often provides the user with the lowest possible water supply cost. Large treatment plants often rely on a filtration process employing major plumbed-in units, such as banks of modular pressure vessels containing RO or other filter elements, for at least one stage of treatment.

These filtration systems, such as nanofiltration (NF) or reverse osmosis (RO) water treatment apparatus, are typically implemented in high-flow treatment applications as cross-flow systems wherein a string or series of filter cartridges are arranged in a lesser number of high pressure fluid vessels, and pumps direct the feed flow through the pressure vessels such that the flow proceeds across the surface of membranes in the cartridges, while permeate passes through the membranes and out via a collection manifold.

Modern filtration pressure vessels may fit up to about eight spiral wound or other membrane filter elements in hydraulic series. These pressure vessels commonly have a single feed inlet, a single reject stream outlet for residual flow of the retentate, and permeate outlets at one or both ends of the vessel. Large water treatment plants often use modular banks of such pressure vessels in order to save money on the cost of valves and piping. High pressure piping and valves required for feeding pressure vessels are relatively more expensive than the lower-pressure conduits employed for the permeate and reject streams, and provision of multi-element pressure vessels reduces the overall number of required pipe connections. The pressure vessels are typically slightly larger in diameter than the filter elements (e.g., RO elements), and as feed water passes each RO element a portion of the water permeates through RO membranes and is collected in the permeate tubes and manifolds. The flow volume and flow velocity of the feed stream progressively fall with downstream position, and the concentration of chemical species in the remaining feed water progressively increases after passage along each element due to such permeation loss. Correspondingly, the amount and quality of permeate that passes through each downstream filter element drops. Thus, a multi-element pressure vessel with n elements produces permeate at a rate that is typically less than n times the output of a single element, and the permeate is also of an intermediate quality which is lower than that of a single element.

The filter "transfer function" of the individual units is determined by membrane type, and varies locally with the driving pressure, ionic content of the feed, temperature, pH and other factors. The general mechanisms and limitations of these processes are best illustrated in the context of reverse osmosis (RO) systems operating to demineralize an aqueous feed, and the discussion of art and description of the invention below shall, for clarity and consistency, refer to RO units, although those skilled in the art will understand that the improvement of this invention may be implemented with corresponding or analogous structure for other filtration devices, and all of these corresponding or analogous structure embodiments are considered to be within the scope of this invention.

Filtration or treatment units of this type remove different undesired species to varying degrees, and membranes may be specialized in different ways to specifically address typical seawater, brackish water or fresh water loading and treatment requirements. A large number of publications deal with the removal of poorly rejected chemical species in liquids treated by RO. U.S. Pat. No. 4,574,049 (as Re-examined) teaches the use of a double pass RO system where sufficient caustic is added to the permeate of the first pass RO upstream of the second pass RO to improve rejection of carbon dioxide by chemical conversion, thus reducing passage of carbon dioxide into the product (as well as ionizing certain other species, if present). U.S. Pat. No. 5,250,185 of Tao, et al., teaches the use of high pH feeds to RO units to improve removal (rejection) of boron. U.S. Pat. No. 5,925,255 teaches increasing the pH of a suitably pre-treated RO feed to improve rejection of poorly ionized species such as boron, silica, and some organics and to reduce the fouling of certain RO membranes. U.S. Pat. No. 6,267,891 teaches the use of ion exchange pretreatment, degassing, and pH control to maximize resistivity of a high purity water produced by a double pass RO system. Many other systems involve ordered regimens of pH change, degassing, scrubbing and filtration and other operations to permit the efficient removal of multiple problematic component pairs of constituents. All of these processes require extensive pretreatment equipment, and most also involve substantial chemical usage on an ongoing basis.

A bulk cross flow filtration process, such as reverse osmosis, is a pressure-driven process that involves filtration by passing the fluid through a filtration medium, such as a filter membrane, positioned across an overall input/output fluid path while the face of the filter membrane is washed by the feed flow. A portion of the fluid permeates through the membrane and is collected as a permeate or filtrate stream, while the remainder of the feed flow traveling along the face of the membrane exits the apparatus as a reject, brine or concentrate stream. Certain impurities, such as suspended matter (if not already removed by pretreatment), ions, and molecules above a certain size are rejected by the membrane. These become concentrated in the reject stream, while other components in the fluid may pass through the membrane into the filtrate. The filtration medium may be contained within a bag, cartridge or cylindrical pressure vessel, and typically is a porous, semipermeable or selectively permeable membrane that is mounted in a generally cylindrical cartridge. Cartridge elements are typically either of a construction that employs a spiral wound sheet filter membrane or alternatively a bundle of hollow fiber filter membrane elements. Such cartridges may be dimensioned to fit within a cylindrical housing or pressure vessel and to communicate with suitable inlet and outlet manifolds and/or ports on adjacent cartridges and/or the pressure vessel. The pressure vessel permits the process to operate at a controlled pressure above the threshold driving force needed for permeation through the fiber or membrane filter. Typically, for processes such as ultrafiltration or reverse osmosis, this pressure is in the range of two to eighty atmospheres, and the pressure vessel is a cylindrical vessel having a length that may accommodate four or more filter cartridges. In the prior art, the high pressure filtration cartridges, such as reverse osmosis cartridges, are typically arranged in a string or series with each other in the flow stream. The cartridges are generally all of the same type or manufacture, and are inserted seriatim from one end of the vessel. Short interconnecting fittings, e.g., short press-fit couplers, may be added between the permeate pipes of successive cartridges in the series. One or more peripheral seals may extend around the outside of each cartridge to generally force the feed water to pass over the membranes of each cartridge in sequence rather than flowing directly around the outside of the cartridge to the downstream elements.

In devices of this type, feed fluid commonly enters at one end of the pressure vessel, at a high rate of flow, and travels along the length of the vessel contacting one side (e.g., either the inside or the outside) of the filter membrane mounted in each filter cartridge. The portion of the feed fluid which does not permeate through the filter membrane exits the apparatus at the opposite end of the pressure vessel as a concentrated retentate or reject stream. Throughout the length of the vessel, fluid is driven through the membranes of the cartridges (e.g., against the osmotic gradient in the case of RO membranes), and the fluid that crosses the filter medium is collected by a suitable manifold structure in each cartridge and passed to one or more outlets of the pressure vessel as a permeate or filtered output stream. Typically the vessel is provided with suitable pipe fittings, which may be incorporated in end caps or other structures, and the filter cartridges have seals, end-manifolds, center-pipe manifolds, or other structure that enables them to form fluid connections with the inlet or outlet flows of the pressure vessel.

Such cross flow filtration units are employed, with suitable membrane structures, for a number of separation and purification processes, including gas mixture separation, electrodialysis, microfiltration, ultrafiltration, nanofiltration, and reverse osmosis. On a commercial scale, many of these applications employ cross flow filtration to separate or remove contaminants from a feed fluid at a pressure that may be elevated to the range of several atmospheres (in the case of ultrafiltration or nanofiltration), or up to twenty to eighty or more atmospheres (in the case of reverse osmosis of a seawater feed) in order to achieve a desired level of flux across the membranes and suitable yield or quality of permeate. Contaminants such as suspended particles, bacteria, viruses, colloids and the like, and substances such as silica, macromolecules (e.g., biomaterial, complexed or highly hydrated inorganic molecules), as well as herbicides, pesticides, salts, and the like may all be removed in this manner with membranes of suitable porosity/permeability. The semi-permeable membrane "rejects" the targeted contaminants, i.e., prevents the contaminants from passing through the membrane and into the permeate stream.

As cross flow membrane filtration processes have become commercially established as effective methods for fluid purification, basic filter module designs and standardized pressure vessels have come to be the "brick and mortar" of water treatment system or fluid separation system design. In this capacity, they must perform without defects for extended times, processing massive flows of water at the lowest possible cost.

The pressure vessels for these filter cartridges are typically cylindrical tube-like structures of standardized diameter that are configured for large modular installations comprised of many banks of vessels, each vessel holding many filter cartridges. The vessels may be made of fiber-reinforced polymer resin composite material, or may be stainless steel, or may be hybrid structures having composite bodies incorporating steel fittings or fitting reinforcements in a composite body. Such vessels may have plug-type closures or end caps that may be removed to provide "full-bore" access to the interior of the vessel for installation or replacement of the filter cartridges. The filter elements typically have a cylindrical cartridge design with simple end seals to enable long chains or strings of filter elements. This facilitates the loading and unloading of modular filtration elements, and simplifies the construction of large capacity systems. Ports for fluid feed and/or for removal of the permeate and concentrate streams are typically located at, and may be physically incorporated into, the end caps, while each cartridge typically joins to the adjacent one with a sealing coupling at its end, such as a central supply or take-off conduit, or similar end-connector structure of suitable strength and dimensional stability.

Correspondingly, filtration membrane suppliers or OEMs in this field have developed modular membrane cartridge elements that typically include a spiral wound membrane/spacer envelope communicating with a central fluid permeate conduit, some structural body or skeleton that maintains its diametral and length dimensions, and some form of cartridge-to-cartridge coupling. The coupling may, for example, include a male or a female ending, typically with O-ring seals, that joins the permeate collection tubes of adjacent cartridges. Multiple cartridges of this type are assembled together with suitable shims in a pressure vessel to provide a fit that limits axial movement and thus avoids erosion of the seals by movement during extended use. A springy anti-telescope/anti-shock device typically is placed at each end of the chain of cartridges to support and absorb axially-directed forces carried by the cartridge shell. The internal cartridge couplings or end supports of one supplier may not be compatible with those of another supplier, so that, as a practical matter, a large water purification or treatment system may operate using many hundreds of cartridges of a single type from a single supplier.

In the commercially available pressure vessels known to applicant, the feed entrance and exit ports are located such that the feed fluid will flow substantially from one end of the vessel toward the opposite end past successive filter cartridges, and the vessels are sized so that two or more filtration cartridges or elements may be connected in series within the vessel to achieve a desired capacity while limiting the overall capital cost of the filtration system. Typical filtration system designs in use today employ pressure vessels that hold six to eight or more "cartridges" or modular filter elements, and these couple or interfit with each other inside the vessel as described above. An engineer may thus design a system of desired capacity by changing relatively simple parameters, such as the number of vessels of the given length, the number of 48-vessel modules, the feed pump rating, supply conduit size and the like. The modular construction allows one to minimize the number of costly components such as manifolds and pumps, as well as valves and sensors, and to effect relatively simple monitoring and control regimens. It also permits simple servicing and replacement of the filtration elements, which are all identical and are typically sized for convenient handling—e.g., the cylindrical elements are under about a meter in length and are usually ten to fifteen centimeters in diameter. Thus, the module-to-module packing of filter cartridges in long pressure vessels provides a flexible approach for plant designs of different sizes.

While the use of modular arrays of multi-element vessels allows one to scale plant size relatively easily and to connect with upstream and downstream processes, it does not provide much flexibility of the filtration stage itself.

U.S. Pat. No. 4,046,685 issued in 1977 to Desalination Systems, Inc. proposed a system wherein a feed enters at one end of an RO pressure vessel, and a ring (24, shown in FIG. 1 of that patent) is fastened at an intermediate position inside the vessel to rigidly position a front RO membrane cartridge. The downstream end of the permeate pipe of the front cartridge is plugged, as is the upstream end of the permeate pipe of the next cartridge, so that permeate exits the vessel in two places—a first flow of high quality permeate at the inlet end of the vessel and a second flow of lesser quality permeate, collected from the several downstream cartridges, at the distal end of the vessel. That patent also suggests that such an RO vessel and output arrangement be employed in a second stage RO, substituting high rejection membranes to produce a lesser amount of a high quality water at the front end and a greater amount of lesser quality water from the remaining elements at the opposite end of the pressure vessel. This is intended to produce two useable water output streams of different characteristics, e.g., to produce domestic and industrial/agricultural water outputs, respectively, from the same RO plant. However, applicant is not aware of commercial systems of the type indicated in that patent. Instead, modern systems employ "full bore" pressure vessels, as previously described. The cartridges employed in these vessels often have directional seals; the cartridge may be inserted unidirectionally from one end of the vessel, and may be removed, typically several years later when spent, by travel in the same direction out the opposite end of the pressure vessel.

In the modern systems employing long, multi-cartridge pressure vessels, there is a practical limit to the number of filtration elements that can be effectively utilized in this manner within a single pressure vessel. This limit is a consequence of the trade-off inherent in the cross flow filtration process. In a pressurized cylindrical vessel as described above, the feed fluid flows axially along the length of the vessel to reach each successive cartridge, and purified fluid passes through the membrane(s) and is collected as a permeate stream. Seals around the perimeter of each element prevent the feed from bypassing a cartridge, so the concentration of retained contaminants continuously increases in the remaining feed water as it becomes loaded with the "reject" of upstream cartridges. The volume of the downstream feed flow also decreases in moving from the vessel feed inlet to the vessel reject outlet. This double concentration effect increases the osmotic pressure barrier and thus the driving pressure that is needed at the surface of each successive membrane element to produce permeate, and results in different filtration characteristics along the length of the pressure vessel. When plural filter cartridges are placed in series, loss of feed fluid to the upstream permeate outflow, and the cumulative fluid drag or pressure drop along the upstream fluid flow path, also operate to reduce the downstream pressure as well as the fluid velocity of the stream as it traverses the length of the pressure vessel. Each of these factors lowers the productivity or efficiency of the downstream modules and the quality of the downstream permeate. In extreme cases (such as in sea water desalination where the semi-permeable membrane is a seawater RO membrane), the "last" downstream filtration element in a pressure vessel may contribute only a tiny fraction of the total permeate flow compared to that produced by the "first" upstream filtration element in the same vessel. Conversely, the upstream element may experience a higher degree of plugging or fouling early in its life due to the increased through flow it experiences, or various elements may age differently due to the differences in both salinity and cross flow velocity.

In constructing multi-cartridge pressure vessels, the end caps or manifolds with their pipe fittings are appreciably more expensive than the plain cylindrical-walled portions of the pressure vessel. Thus, the cylindrical body of a glass composite pressure vessel rated at 1000 psi may be manufactured for about $20-40 per linear foot (thus, $40-$120 per cartridge), while an end cap with inlet, suitable sealing faces, and permeate and possibly brine outlet connections may cost several hundred dollars, substantially raising the price of the vessel. This suggests that it should be cost effective to extend the length of a pressure vessel to hold more, e.g., 8-10, filter cartridges while still using only two end fittings. However, as discussed above, while the relatively low marginal cost of adding additional filter modules in a linear section of pressure vessel is inviting, a reduction in relative yield and quality occurs with the addition of further filtration elements in the vessel. Moreover, if a designer were to address capacity by using longer vessels to hold more modules, operation at the flows and level of pressure necessary to effect separation at the designed capacity could require much larger pressure pumps and thereby substantially increase energy utilization. The level of required energy may also vary over time depending upon seasonal changes in feed water characteristics, on filter and cartridge characteristics, membrane aging or fouling conditions, and the structural configuration of the system, among other determinants. Cartridges may scale or foul. These factors may therefore combine to drive down performance or increase capital costs, operating costs or both in a way that ultimately requires steady-state operation at less than optimum efficiency or at less than the intended or the rated capacity. For these and other reasons, the capacity of RO pressure vessels remains limited and has become relatively standardized, commonly holding at most around 6-8 filter cartridges in series. Even with such vessels, and the ability to vertically stack banks of many vessels, large warehouse-size treatment buildings are required to house a major RO plant, and better efficiency and/or greater compactness would be highly desirable.

Because cross flow membrane filtration processes such as reverse osmosis (RO) and nanofiltration (NF) are now routinely employed for water desalination and brackish water treatment projects that involve massive volumes of fluid and must operate for many years, the economic consequences can be substantial. These systems may involve large operating costs for energy and chemicals in addition to the initial capital expenses of construction and plumbing, and they require periodic membrane or cartridge replacement. The ever-increasing size of RO and NF projects entering the planning and design stages today requires consideration and implementation of incremental cost saving measures that may, over the lifetime of a project, affect any of these cost components and thus may produce substantial savings for the owner, operator, and/or other customer of the project. The use of conventional, multiple element pressure vessels may in some circumstances lower the capital cost of such systems by providing greater capacity without additional construction costs; however, the compromise of operating efficiency as noted above attendant with the use of such vessels may increase the later operating costs for the same systems. Institutional predispositions or weaknesses within a contracting authority, such as a public water board, as well as the bidding process itself may bias the evaluation of treatment plant designs and result in a failure to fully consider or understand future performance or maintenance cost issues. Nonetheless, current modular filtration systems have become increasingly locked into the use of basic units having these limitations. The consequences for ever-larger RO and NF systems being designed and built today may be substantial.

It would therefore be desirable to provide a multi-cartridge cross flow filter assembly and associated fittings of enhanced design versatility and/or performance.

It would also be desirable to provide basic vessel, filter cartridge and associated fittings, or that provide an increase in vessel scale or filtration capacity without detrimental loss of efficiency.

It would also be desirable to provide basic vessel, filter cartridge and associated fittings that increase output, that reduce operating costs, or that otherwise enhance energy utilization or maintenance efficiency of a plant.

These and other limitations of and deficiencies in the prior art filtration/purification systems are addressed in whole or in part by the improved system designs and methods of this invention.

SUMMARY OF THE INVENTION

Systems according to the present invention employ a pressure vessel housing a number of filtration elements, such as RO elements, arranged in a string or series, and are configured to produce permeate streams under two sets of conditions or to produce separate or separable permeate outputs of two (or more) different qualities. In accordance with one aspect of the invention, a vessel and/or the filter cartridges themselves are arranged to split the flow of permeate from the elements into two streams. In accordance with another aspect of the invention, the vessels and filter cartridges may produce a single permeate output, but may also control the pressure and/or the back pressure acting on separate individual filter elements or subgroups of one or more filter elements within a single vessel to enhance operation and/or performance.

A treatment plant using a system according to the present invention as one stage or treatment may treat one or more of the permeate streams from that stage (such as a lesser-quality stream) by further processes, such as reverse osmosis, nanofiltration, ion exchange, electrodialysis (either unfilled or filled cell electrodialysis), dialysis, distillation, ultraviolet light, absorption in or adsorption on various media. The treated stream(s) may be blended back with a higher quality permeate (e.g., from upstream filter elements) to produce a product meeting maximum predetermined or specified concentrations or concentration ranges. Treating only permeate from downstream elements in such further processes results in much lower equipment costs as such costs correspond to the volumetric flow rate of the liquid to be treated.

One or more of the foregoing desirable ends and operating advantages are obtained in accordance with one aspect of the present invention by a cross flow filtration apparatus, such as a reverse osmosis (RO) apparatus, having an elongated pressure vessel, such as a cylinder, with a side entry port. The vessel has a length to accommodate a plurality of n filter cartridges positioned within the vessel, wherein n is an integer of two or greater, preferably four or greater. The side entry port is preferably placed at an intermediate stage of the vessel's length so that the feed flow is divided into a first feed flow directed through a first filtration branch or set of less than all of said filter cartridges, and a second feed flow directed through a second filtration branch comprised of the remaining ones of said filter cartridges. The first and second branches extend in opposite senses, toward respective ends of the vessel, while permeate or filtrate passes through the membranes and is collected in the permeate manifolds of cartridges in both branches. A spacer-adapter may bifurcate the feed flow and direct it centrally outward into the cartridges of the first and second branches. In a preferred embodiment, the two filtration branches are of equal length, i.e., contain equal numbers of filtration elements. This system produces a filtrate stream of enhanced permeate transfer efficiency and quality, with a large number of cartridges arranged along short flow paths and operating with a lower overall pressure drop per stage.

Each filtration branch comprises a relatively low number of filter cartridges (e.g., 2-6 and more preferably 3-4 cartridges), and the cartridges of each branch are connected in series with each other to pass permeate to a common outlet. The number n of cartridges accommodated in the pressure vessel is preferably even, so that the branches can be made symmetrical with n/2 cartridges in each branch. However, the side entry port may be placed at a non-centered position along the pressure vessel, or the two branches may otherwise accommodate different numbers of cartridges, e.g., (n+1)/2 and (n−1)/2, or a 5-3, 5-2 or 4-2 apportionment of cartridges. The latter arrangement advantageously enables design of asymmetric treatment systems for high flow apportionment to produce two different-quality permeates. The higher quality permeate from the lesser chain of cartridges may constitute a bypass fraction of permeate. In systems of the invention, for example, the permeate stream of one branch may be subjected to a further treatment stage while the permeate stream of the other branch may form a bypass flow that is blended downstream to form a product water output of desired quality. Systems of the invention achieve a flux substantially higher than a single conventional in-line pressure vessel having the same number of RO cartridges, and each end or branch of the vessel operates at the high initial flux and low concentrate levels. Systems according to embodiments of this invention may be implemented with little or no additional valving or special plumbing.

Large capacity water purification plants may employ plural banks of such side-entry vessels in series to achieve a high capacity staged system. Each bank may comprise the same or a different number of vessels, or vessels of a different length comprising different numbers of filtration cartridges. The system may employ a booster or interstage pump ahead of a downstream bank, as known in the art, to set a flux-optimized pressure that maintains the desired through-flow at a minimal power cost. Systems may be configured with flow valves that may be controlled to direct the permeate from one bank to back flush or to effect cleaning cycles of another bank so as to maintain operating efficiency of the various banks or modules within the system. Advantageously, systems of the invention may operate with lower pressure drop per stage compared to systems having the same number of cartridges with end-vessel inlets and outlets. In a two-stage or multistage system, this may obviate the need for an interstage booster, and it further enables substitution of less costly equipment, and/or different configurations of equipment, and recovery of or direct utilization of the first stage output pressure in downstream stages or passes.

A side entry pressure vessel according to the present invention may include a pressure vessel having a side inlet positioned a fraction of the way along its length, and a feed water entry node adapter configured for insertion into the pressure vessel to a position at the vessel's side inlet port. For a vessel of length L, the inlet may be positioned at L/2, L/3, 2L/5 or similar fractional length. The adapter is then positioned to serve as a spacer or separator at a common end point between two branches or strings of contained filter cartridges, operating as a flow branch point or bifurcator for flow in both branches and permitting feed flow to the cartridges via the vessel inlet. The entry node adapter may include a simple inter-cartridge spacer, or may include a thrust absorbing structure against which ends of the adjacent cartridges abut, allowing the series of cartridges in a branch to be securely positioned while resisting telescoping forces on the cartridge body. Thus, the entry node for a vessel of n cartridges would be located at 1/n, 2/n, 3/n or other fractional position along the vessel corresponding to an integral number of cartridges.

A filter cartridge for use in a system according to the present invention may be a conventional cartridge. It may have a central pipe forming a manifold communicating with the interior of the RO membrane for collecting the permeate from the cartridge. Typically, each central pipe or flow tube, or other manifold structure, sealingly interfits with or connects to a corresponding tube or structure of an adjacent cartridge, and forms a seal thereagainst in a manner known in the art (e.g., with a short stub-connector). The cartridge may also include a disk-like end cap having a peripheral seal, e.g., one that seats against the inner wall of the vessel along its outer edge. The seal may include an O-ring seal or packing, or may be a looser or directionally-flexible seal such as a chevron seal. In the latter case, when used with a side entry vessel of the present invention, the vessels are preferably loaded with two sets of filter cartridges having their chevron seals facing in opposite directions in the two branches. This permits both branches to obtain suitable sealing around their periphery to prevent feed stream bypass flow, while enabling each branch to be removed from the vessel along an appropriate direction without jamming. For example, each string of cartridges may be withdrawn, when it is necessary to replace the cartridges, outwardly at its respective end of the vessel.

In a preferred embodiment of this aspect of the invention, when the cartridges each have chevron or other directional seals about their periphery to prevent the feed stream from passing outside the cartridge to downstream filter elements ("downstream" in this usage being intended to mean further removed from the side entry port, that is toward one or the other end of the pressure vessel), a tool may be provided for cartridge installation. In accordance with one aspect of the invention, there is provided an installation tool that operates to cover or compress the chevron seal during insertion into the vessel. The tool may include a sleeve or thin envelope, or may include a narrow circumferential band, that fits over the chevron or other seal in order to permit sliding insertion of the cartridge into the vessel, in either direction, without seal damage. The tool is preferably configured such that the insertion tool itself may be completely removed from the vessel after installation. It may be formed of a soluble material, such as a sheet of low cross linked monomeric polymer, or otherwise soluble harmless material so that it automatically dissolves in the feed stream and disappears after installation; or, it may include an envelope or compression band having a construction, such as a tear line and pull string, that breaks the loop, becoming a thin strip of sheet material that is readily disengaged from the seal and can be pulled out of the vessel after the cartridge has been inserted into the pressure vessel.

In accordance with another aspect of the invention, one or more check valves, restrictions or obstructions, which may be fixed or movable, are positioned within a flow passage of the filter cartridges (such in or as at the end of the central permeate tube of a cartridge), and these operate to divide the permeate flow entering one region from the permeate flow entering another region along the vessel. Alternatively, such valves, restrictions or obstructions may modulate the pressure or pressure drop occurring at each cartridge and thus control the filter yield and/or quality without dividing the permeates thus obtained. In the latter case, the pressure/flux characteristics at each cartridge or region may be set to produce a combined stream of the desired quality.

The invention also includes novel system architectures and methods of use. A method of configuring a filter stage includes the steps of loading a plurality of filter cartridges into a pressure vessel such that the cartridges form two strings or branches of series-connected cartridges with their permeate outlets disposed at respective opposite ends of the vessel.

BRIEF DESCRIPTION OF THE DRAWINGS

These and other features of the invention will be better understood from the following description and claims, taken together with figures illustrating exemplary embodiments and useful details of construction, wherein:

FIG. 8 is a simplified diagram depicting a single membrane separation element embodiment having permeate divided by means of two adjustable concentric tubes inside a main manifold;

FIG. 9A is a simplified diagram depicting a single membrane separation element embodiment with a movable, mechanically deformable plug in an elongated (non-plugging) state;

FIG. 9B is a simplified diagram depicting the single membrane separation element embodiment of FIG. 9A having its mechanically deformable plug in a compressed (plugging) state;

FIG. 10A is a simplified diagram depicting a single membrane separation element embodiment with a movable, hydraulically or pneumatically inflatable restriction object (e.g., a balloon) shown in deflated (non-plugging) state; and FIG. 10B is a simplified diagram depicting the single membrane separation element of FIG. 10A in which the movably positionable inflatable restrictor is shown in an inflated (plugging) state.

DETAILED DESCRIPTION OF ILLUSTRATED EMBODIMENTS

Figure 1:
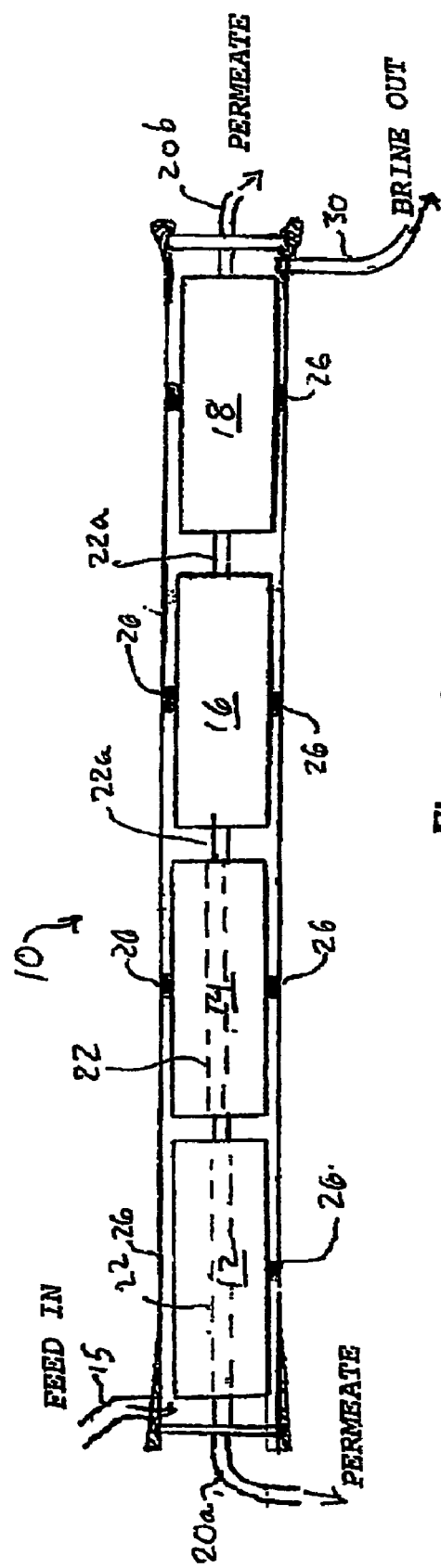
FIG. 1 illustrates a typical prior art cross flow filtration vessel and filter cartridges.

FIG. 1 illustrates the context of the invention, showing by way of example a typical conventional pressure vessel 10 of the prior art that holds a plurality of reverse osmosis or filtration membrane modules or cartridges 12, 14, 16, and 18. For clarity of illustration, only a few cartridges are shown, although as noted above, a vessel of this type may in practice be sized to hold six to eight or more RO membrane modules. The illustrated vessel 10 has an inlet 15 for feed fluid at its proximal end, outlets 20a, 20b for permeate that has passed through the filtration modules 12, 14, 16, and 18, and a reject or retentate outlet 30 at the distal end for the remaining (unfiltered) liquid residue from the feed stream. The feed is applied at one end to the interior space of the vessel, and the permeate is collected via conduit 22 located on the central axis of the vessel that serves as a collection manifold. The conduit 22 is typically comprised of conduit segments that are each associated with one cartridge and are suitably coupled to the interior of a membrane carried by that cartridge. These segments or filter cartridges may terminate in male or female couplings, and are configured to interconnect to each other, e.g., via short stub connectors 22a, having O-rings or other seals thereon, in a manner known in the art. The permeate pipes of the proximal and distal end cartridges connect to permeate outlet ports in one or both vessel end caps. At the end of each filter cartridge, a cap or plate (not shown) may provide shape and structural rigidity which aids in assuring a generally open fluid path for the high pressure feed stream to reach the exposed surfaces of the outside of the membrane, and which may also help resist telescoping or deformation under the high pressure flows in the vessel. Seals 26 extend around the outside of each cartridge 12, 14 ... and seal against the inner wall of vessel 10 to assure that the feed proceeds downstream from the proximal to the distal end within the vessel only by flowing in sequence across the membrane surface of each successive cartridge.

One common RO cartridge construction employs sheet membranes wrapped about a foam spacer to form an envelope that is spiral-wound into a cylinder-shaped cartridge such that the permeable foam of the envelope interior connects to a central permeate collection pipe (22, FIG. 1). Other cartridges may employ different geometry or structural layout. For example when the membranes are hollow permeable fibers, the fibers may be potted to manifolds at the ends of the cartridge such that the interiors of the fibers connect to the manifolds, which thus collect the permeate and, in turn, communicate with a permeate pipe 22 to deliver collected permeate to the outputs 20a, 20b of the pressure vessel. Other arrangements and geometries may also be used to connect a feed conduit and a permeate tube in communication with opposite sides of the membrane. Generally, for an RO system, the feed pressure $P_i$ at the inlet is well over five atmospheres, and for a multi-stage seawater RO process may be as much as fifty to eighty atmospheres or more, for driving the permeation process and achieving suitable flow.

RO systems typically employ a large number of pressure vessels 10 connected in parallel as a bank. In each pressure vessel, the permeate outlet pressure $P_o$ from the pressure vessel is lower than the feed pressure $P_i$ by an amount $\Delta P$ corresponding to various internal sources of drag and the required transmembrane driving pressures. This pressure drop may be regulated or controlled by a suitable back pressure valve or other arrangement, and may be set by feedback control in response to readings from one or more sensors, for example to compensate for temperature variations of the RO transfer characteristics. When a two-pass system is used, this permeate output is fed to the next pass RO unit. Similarly, the reject stream from the first bank may be fed to a second or further stage RO unit to recover additional water, albeit of lower quality, from the concentrated reject stream, and thus enhance recovery.

While not specifically illustrated, the permeate tubes of each cartridge typically have, or interconnect with couplers that have, a seal structure, such as one or more O-rings that enable the cartridge to sealingly interfit with the manifold or permeate tube of an adjacent cartridge. Generally, all the membrane cartridges are loaded into the vessel and remain held together by closing the vessel with an end cap loaded against the final or end cartridge. Suitable shims may be inserted during the cartridge installation process to fit the chain of cartridges to the vessel, and the end cap may seal to the permeate tube and constitute the permeate output connection for the vessel. Typically an anti-telescoping device having the form of a somewhat flexible or springy spider-like brace secures and supports the cartridge in position at one or both ends of the vessel.

Figure 2A:
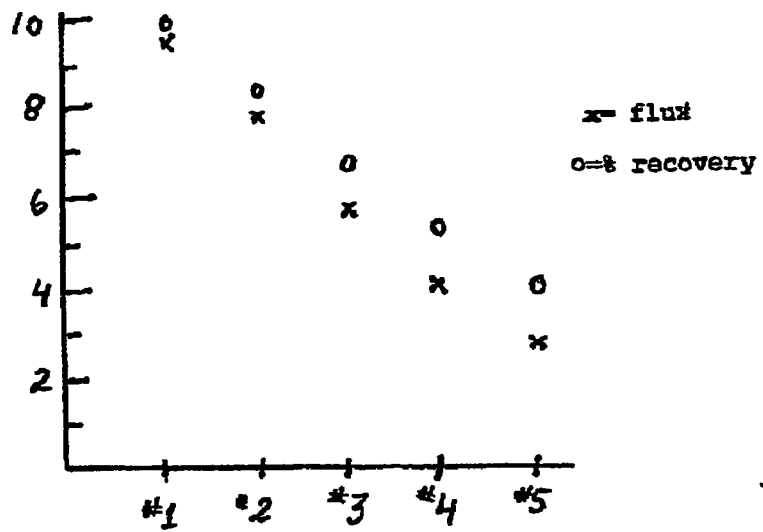
FIGS. 2A and 2B schematically illustrate operating characteristics and cost of the device of FIG. 1 as a function of vessel size.

FIG. 2A illustrates in a schematic way and in approximate units, the transmembrane flux through each cartridge as a function of cartridge position along the length of a vessel such as the vessel of FIG. 1. The figures were calculated for brackish feed to a five-cartridge RO pressure vessel and a driving pressure of 59 atmospheres, with a back pressure of one atmosphere. The Figure shows a progressive reduction in flux and in recovery with downstream position for each successive cartridge of the five cartridge pressure vessel. As noted in the discussion above, this reduction is a consequence of the progressive increase in osmotic barrier due to rising retentate concentration level and to decreased cross-flow. Correspondingly, the passage of minerals through the membrane in permeate rises approximately four-fold by the last cartridge resulting in poorer quality permeate from the downstream cartridges.

Figure 2B:
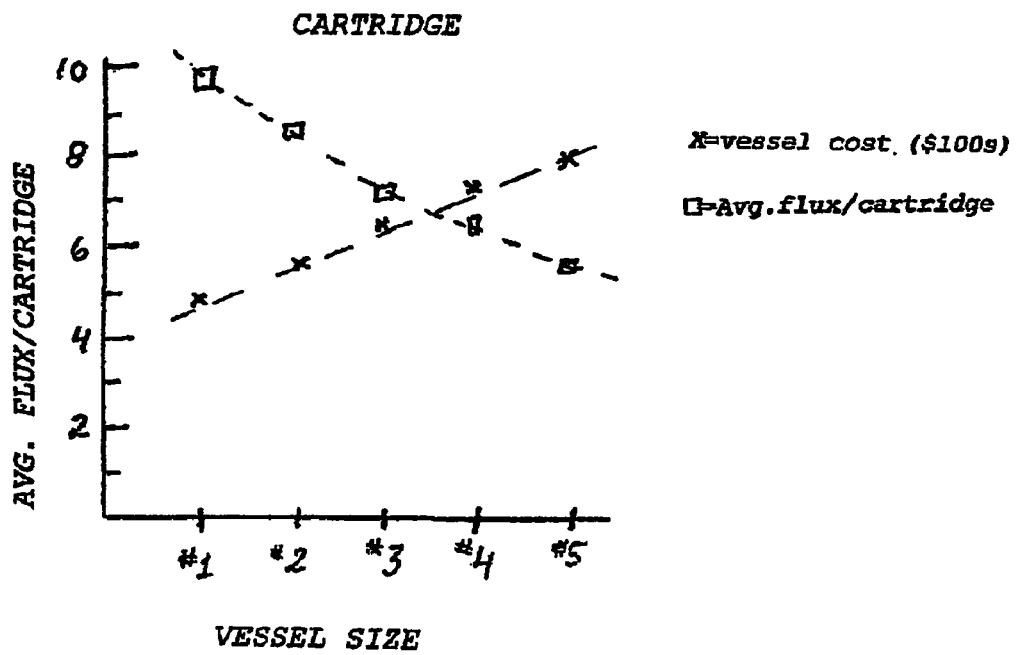

By way of overview, FIG. 2B schematically plots the average flux per cartridge (the total for all cartridges of a vessel divided by the number of cartridges) as a function of vessel length for vessels holding between one and five cartridges, based on the fluxes of FIG. 2A. The five-cartridge vessel provides about three times the total flux of a one-cartridge vessel, although it must be noted that the permeate from the downstream cartridges is of lower quality. Finally, FIG. 2B also illustrates the approximate capital cost of a vessel as a function of length (in number of filter cartridges), applying a representative vessel component cost estimates of $200 per end cap (with two such caps per vessel) and $40 per linear foot, and assuming the membrane cartridges are two feet long. These numbers were selected simply to illustrate the form of the vessel cost function, which has a low marginal cost per cartridge based on the lineal charge for a straight cylindrical vessel tube. As is apparent from these charts, the incremental vessel cost for additional cartridge-holding capacity is low, since the two vessel end caps are significantly more expensive than the per foot nominal cost of the cylindrical vessel body. Thus, although the incremental flux is sublinear, longer vessels do provide a route to increased flux at a relatively lower initial vessel cost, at least for the first five cartridge lengths. However, as noted above, quality drops off, and after a five cartridge length, the flux drops still lower. This constraint imposes a practical limit of about six to ten cartridge lengths on the RO vessels. In addition, the cost of cartridges must be considered, as well as their replacement requirements. The scaling propensity of the cartridges will vary with their position in the chain because the upstream cartridges experience a greater through-permeation while downstream ones experience substantially higher salinity as well as less vigorous cross-flow. These factors affect the type and rate of membrane aging. Overall, without considering these factors, the vessel costs per unit of flux would appear to generally decrease from about $50/unit to $27/unit with increasing vessel length. However, adding in the cartridge costs (at $300 per cartridge, for purposes of illustration), the total cost per unit flux would dip slightly from a high of $80 for a one-cartridge vessel, and then quickly rise again after the vessel attains a few cartridge lengths. Thus the unit cost for longer pressure vessels (Le., more filtration elements in series) in an RO system is not particularly advantageous, and permeate quality is sacrificed. Substantial savings appear largely in the reduction of plumbing connections and number or capacity of pressure pumps or energy converters. Thus, the multi-cartridge vessels present a not particularly well defined trade off between initial capital cost, on the one hand, and water quality, capacity, and maintenance/replacement expense on the other hand.

Briefly, the present invention addresses this limitation by providing an RO vessel with branched permeate flows for enhanced operation. In one embodiment, a feed port is positioned at an intermediate position along the length of the vessel. For this "side-entry" embodiment, feed flow branches into two short paths, efficiently producing two permeate streams that both have higher flux and higher quality "front end" permeate characteristics. The total recovery is high, and the two permeate rams may be combined or utilized separately, allowing a number of advantageous new system configurations. Other embodiments, discussed below in regard to FIGS. 5-6C achieve a branched flow utilizing one or more permeate flow restrictions, obstructions or valves, with either a side-entry or a conventional pressure vessel.

By way of example, for a side-entry embodiment, the entry may be at the center of a four-cartridge vessel producing permeate through two branches of two cartridges each, or at the center of an eight-cartridge vessel feeding two branches of four cartridges each. It may alternatively be positioned, e.g., one-third of the way along a six cartridge vessel, producing two streams of permeate comparable to those of a two-cartridge vessel and a four-cartridge vessel of conventional construction. As will be appreciated from the discussion herein, placement is preferably a few cartridges along the length of a many-cartridge vessel, to produce a first end permeate of relatively good quality, and a second end permeate which may be further treated if necessary, in order to increase the overall recovery.

Figure 3A:
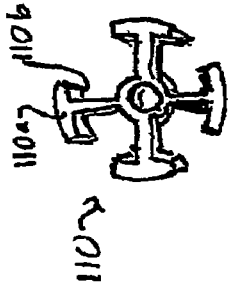
FIGS. 3 and 3A illustrate a multi-cartridge pressure vessel of the present invention and spacer for use in the vessel.
Figure 3:
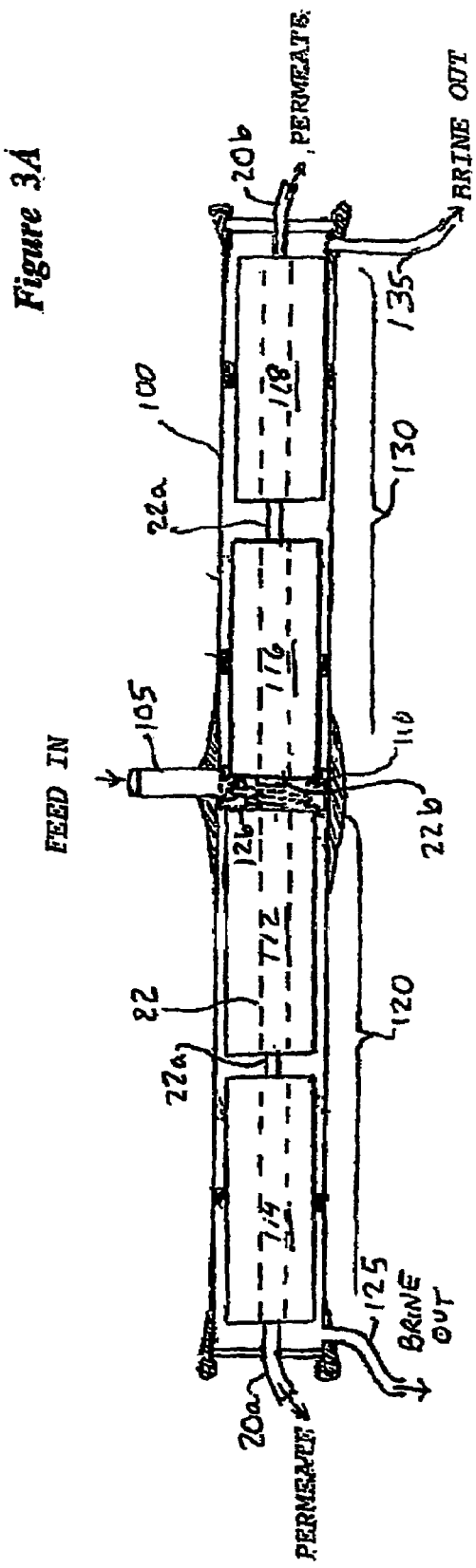

FIG. 3 illustrates, partially in cut-away view, one embodiment of a side entry branched flow vessel 100 and cross flow filtration system 150 of the present invention. The pressure vessel 100 has a centrally located side entry port 105 for feed water entry, and has a flow dividing structure such that the vessel entry is a node between first and second oppositely-directed flows of feed along two chains or branches of filter cartridges, chain 120 comprising a first set of cartridges 112, 114, and chain 130 comprising a second set of cartridges 116, 118, respectively. Two vessel brine outlets 125, 135 are located at the respective ends of the vessel 100, and as in FIG. 1, the cartridge permeate tubes are connected to permeate outlets 20a, 20b in the vessel end cap at each end of the vessel. Branching of the feed into two separately-directed flows across the two chains of cartridges is assured by the peripheral seals 126 (which may be the conventional seals 26 of FIG. 1, as discussed further below) so long as the adjacent ends of the vessels 112, 116 are spaced apart from each other a sufficient distance to accommodate the feed flow at their inlets. Such spacing may be obtained by placing end plugs 22b at the proximal (central) ends of the permeate tubes of cartridges 112, 116. Alternatively or in addition, a relatively open brace or anti-telescoping structure may be configured to separate the cartridges and support the cartridge periphery. A special divider structure 110 shown in phantom, may be used to separate the central cartridge ends. One embodiment of a suitable structure 110 is shown in FIG. 3A. This may be a simple casting or molded piece that is positioned at the central port 105. In some embodiments, such a structure may be physically incorporated into the vessel structure during fabrication of the vessel (for example, by interwinding epoxy/fiber layers around the structure in a cylinder and curing the composite material). Such spacer structure, if used, may also be a separate structure, such as a peripheral spring or spider assembly, that is simply rotationally aligned with the inlet and inserted into the vessel at a later time (such as during loading or replacement of the filter cartridges in the vessel) between the two cartridges. When the spacer/divider structure is configured to be later and separately inserted to the central position in a finished vessel it will generally be referred to simply as an "adapter" herein.

The adapter or divider structure 110 performs several functions, operating as a flow divider, to channel or allow feed fluid that enters at the inlet of the pressure vessel to flow outwardly as two streams directed to the respective opposite ends of the vessel, by acting as a stop or spacer for filter modules that contact its two ends 110a, 110b, defining a precise insertion depth for each of the two branches of filter modules. Both of these results may be accomplished by a simple skeletal divider structure, such as a pair of axially-spaced hoops or a single thick disk assembly having sufficiently open cross-section (e.g., through passages or cut-away portions to permit high flow from the vessel inlet to the cartridge ends, but sufficient rigidity to provide a stable end-stop for the inserted cartridges. By defining a space between the ends of the two branches, the feed is effectively branched in both directions. The divider may incorporate further structures, such as a connector conduit that joins the permeate tubes of both branches, or a protruding structure that abuts against and plugs closed the central end of the two adjacent permeate tubes, or it may include an opening centered on the vessel axis that allows a conventional cartridge stub connector (22a, FIG. 1) to pass therethrough. Preferably, however, the inner end of the permeate tube of each of the two central cartridges is simply plugged or capped, independently of the divider, prior to insertion of these cartridges into the vessel. Permeate then flows through each branch outwardly, toward a respective terminal cartridge and the permeate port at each end of the vessel.

In the embodiment of FIG. 3, the four-cartridge vessel would have roughly twice the flux of a two cartridge vessel (FIG. 2B) and vessel cost would be roughly the same cost as a conventional four cartridge vessel with a simple side port added, resulting in a substantially lower cost per gallon. The two parallel branches of two cartridges would have a higher output of better quality permeate than the conventional four-cartridge vessel. Similarly, six- or eight- or ten-cartridge center entry RO vessels would each provide twice the flow of a three-, four- or five-cartridge vessel, respectively, at higher quality and for far less capital cost than the cost of doubling the number of vessel banks.

Figure 4:
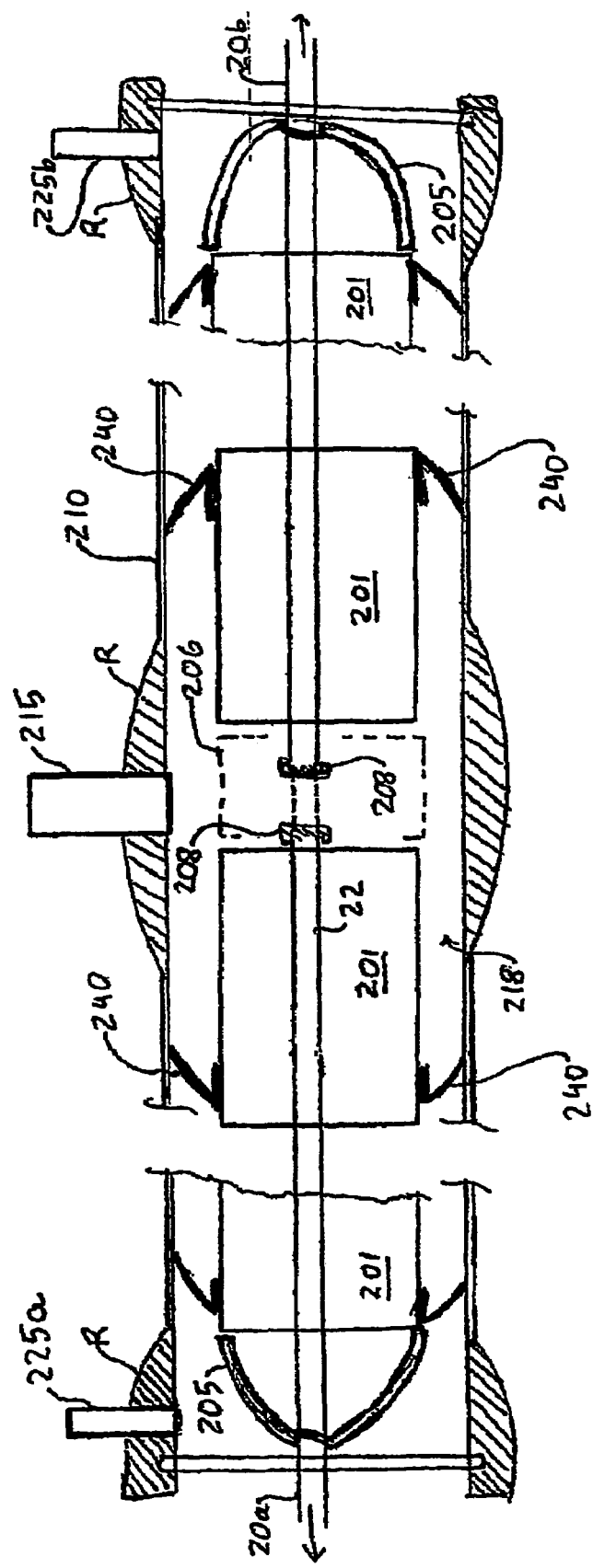
FIG. 4 illustrates another embodiment of the invention.

FIG. 4 shows another embodiment 200 of the invention, illustrating further details of a cartridge sealing and vessel structure that may be employed separately or together to implement branched permeates in various implementations of the invention. Embodiment 200 has a vessel 210, which, for clarity of description, shall be considered as an eight-cartridge vessel although as noted above other embodiments may have fewer or more cartridges. In the Figure, each cartridge is labeled 201, without regard to position or flow sequence. A first port 215 enters the side of the vessel 210 at a central or intermediate position, and two additional ports 225a, 225b are located at respective ends of the vessel. As in the embodiment of FIG. 3, a permeate pipe 22 connects the cartridges to permeate outlets 20a, 20b at the ends of the vessel 210. Vessel 210 is illustrated as a glass composite or similar vessel construction having a generally tubular, uniform-walled cylindrical body that is reinforced by additional material (in the bulging regions denoted R in the Figure) at those regions where there is a port, end plate or other structural or more highly stressed fitting. Anti-telescoping units 205, which may be of conventional type, are fitted at each respective end of the string of cartridges 201 to take up slack and absorb shock. Adapters of the invention may be configured similarly, i.e., may specifically be designed for use in the invention to function as a bi-directional anti-telescoping spacer/support between the central ends of the two strings of cartridges. This device, 206 (indicated in phantom) fits between two central cartridges nearest the port 215 and provides a sufficient space between the ends of the cartridges to accommodate the feed flow without restriction. It thus serves as a feed flow divider. The permeate pipes of these two cartridges may be plugged by respective plugs or caps 208 at this position, or as indicated in phantom, may connect straight through. If plugs or caps are used, these may protrude sufficiently to assure proper flow spacing between the central cartridges without an additional spacer. Alternatively, the permeate pipe 22 may be a continuous pipe extending through all cartridges of the vessel; in that case, the spacer 208 may have a shape that permits it to fit around the permeate pipe. In either case it will be understood that the permeate pipe 22, whether "continuous" or comprising two segments each plugged at the center, is cobbled together from the permeate pipe segment that forms part of each cartridge, and stub connectors such as are conventionally inserted to connect between cartridges or between a cartridge and the permeate end ports of the vessel.

As further shown in FIG. 4, there is a space or gap 218 between the outer periphery of each cartridge 201 and the inner wall of the vessel 210. The drawing is not scaled, and in practice the space is quite narrow relative to the vessel and cartridge diameters, being on the order of only several millimeters, just sufficient to assure that the long cartridges may be dependably fitted into the vessel, while leaving a peripheral gap that can be effectively sealed to prevent the feed stream from bypassing the membranes in the cartridges 201. For this purpose each cartridge is equipped with one or more peripheral seals 240. The seals may be ring or O-ring seals or packing, but preferably are a looser or more compliant flex seal construction, i.e., a chevron seal, shown by seals 240 in FIG. 4. Chevron seals allow a cartridge to slide in one direction for insertion without risk of dislocating or deforming the seal, while assuring a tight pressure barrier, once inserted in the vessel, against flow in the same direction. As shown in FIG. 4, the chevron seals of the two chains of RO cartridges are oriented in opposite directions. That is, the left chain is oriented to seal against passage of feed around the outer periphery of the cartridge from the center to the left end, while the right chain of cartridges is oriented to seal against peripheral flow directed from the center to the right end. Chevron seals yield to pressure in the direction opposite their sealing orientation, however, and do not "scoop" deposits and jam, so each string of cartridges may be withdrawn, when it is necessary to replace the cartridges after several years of service, outwardly at its respective end of the vessel. For this purpose, a hook/puller mechanism may be inserted into one branch to pull the cartridges of that branch outward, after which cartridges of the other branch may be similarly removed, or may be pushed out their respective end of the vessel.

In a preferred embodiment, where the cartridges each have chevron or other directional seals about their periphery to prevent the feed stream from passing outside the cartridge to downstream filter elements, a tool may be provided for cartridge installation to prevent seal damage when the cartridge is inserted against its normal direction of movement. In conventional systems, all chevron seals face the same direction, and cartridges may be inserted into the vessel through one end of the vessel, so that the chevron seals flex down without risk of damage. In the embodiment of FIG. 4, however, the cartridges of one branch must be installed against their usual direction of movement. While one branch of cartridges may be simply inserted by pushing them into the vessel in their normal orientation from the opposite end of the vessel, the other branch would then have to be inserted from the same end even though the respective seals would be oriented in the opposite direction. That is, either the cartridges of the left branch must be inserted from the left end against their orientation, or the cartridges of the right branch must be inserted from the right end against their orientation.

This is accomplished without risk of seal damage in accordance with one aspect of the invention by providing an installation tool that operates to cover or compress the chevron seal during insertion into the pressure vessel. When a pressure vessel is new, adequate results may be obtained by a simple seal compression tool similar to a piston ring compressor as used for engine assembly in the automotive industry, such tool comprising a circumferential band of strong sheet material that may be tightened around the seal and compress it radially inward during cartridge insertion. The band may be loosened and withdrawn once the seal region has entered the vessel. Years later, when it becomes necessary to replace filter cartridges, there will generally be a certain amount of deposit accumulated on the cartridge surfaces as well as on the vessel wall. However, the relatively large movement and directional nature of the chevron seals when the lip of the seal flexes downward (radially inward) allows each set of cartridges to be withdrawn out its respective end of the vessel. However, these deposits may make insertion of replacement cartridges more difficult. In this case, for replacing cartridges in an older, scaled vessel it is preferred that a seal insertion tool be configured as a wider band or sheath to protect the seals against damage as they enter the vessel and also as they slide along to their respective final installed positions. One such tool may be configured as a thin envelope, sleeve, or sheath that fits over and covers the chevron or other seal, so that it not only urges the lip of the seal radially inward but also covers the entire seal from contact with, and from clogging or abrasion by, the vessel wall and accumulated deposits. Such a protective sheath permits sliding insertion of the cartridge into the vessel, in either direction, without seal damage.

The tool may be configured to facilitate and allow complete removal of the tool from between the cartridge and the vessel after cartridge insertion. Thus, the protective cover may be a strong but stiff polymer sheet that is easily pulled intact from the vessel after insertion of the cartridge. Alternatively, the cover portion may be formed of a soluble material, such as a sheet of low cross linked monomeric polymer, or otherwise soluble harmless material, that wraps around the cartridge for insertion but such that it automatically dissolves in the feed stream and disappears after installation. Other suitable constructions include an envelope or compression band that tightens about the seal, but having a construction such as a tear line and pull string that breaks the loop into one or more thin strips of sheet material that disengage from the seal and may be directly removed from the vessel simply by pulling the end of the strip following use.

In accordance with another aspect of the invention, a filtration system may advantageously be implemented in part in conjunction with a flow divider that apportions the permeate outputs, e.g., by controlling back pressure or by obstructing flow at a position in the permeate tube or along the permeate flow path. This may be done by providing an obstruction in the permeate flow path, such as a plug, baffle or valve as described below.

Figure 5:
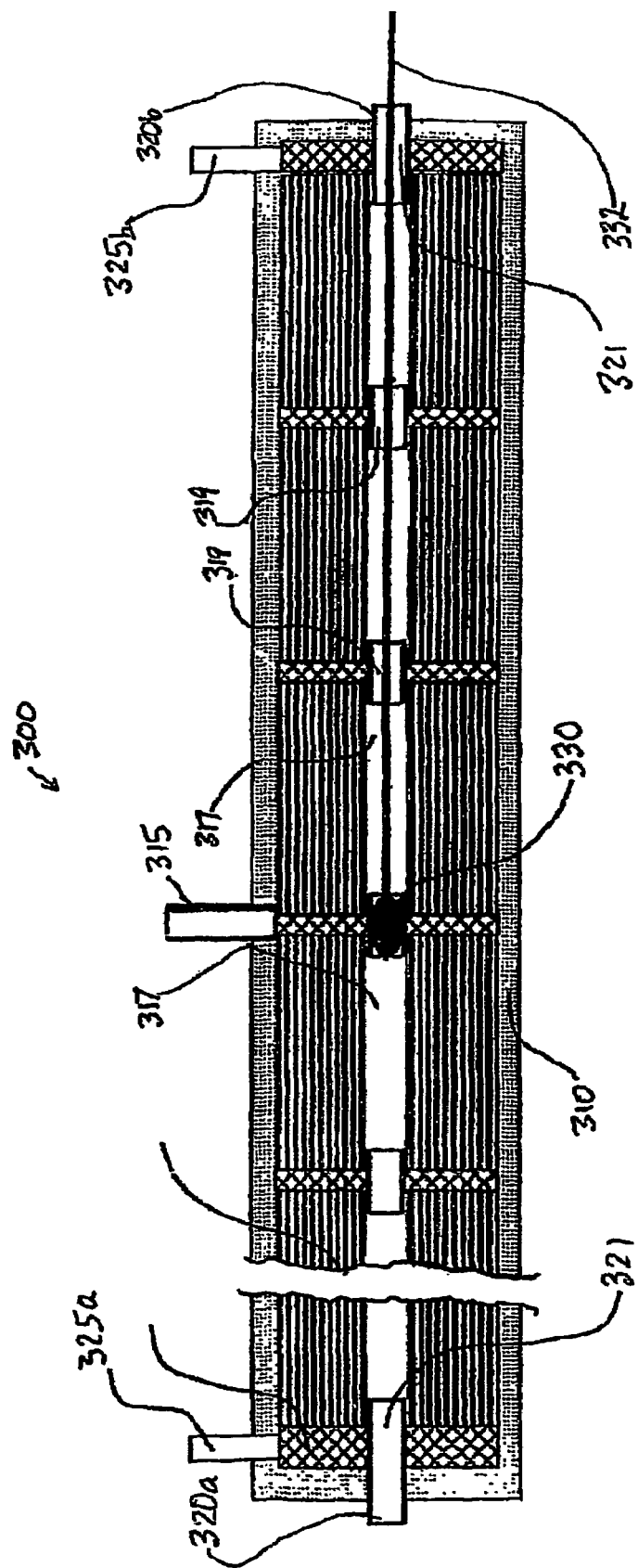
FIG. 5 illustrates another embodiment of the invention.
Figure 5A:
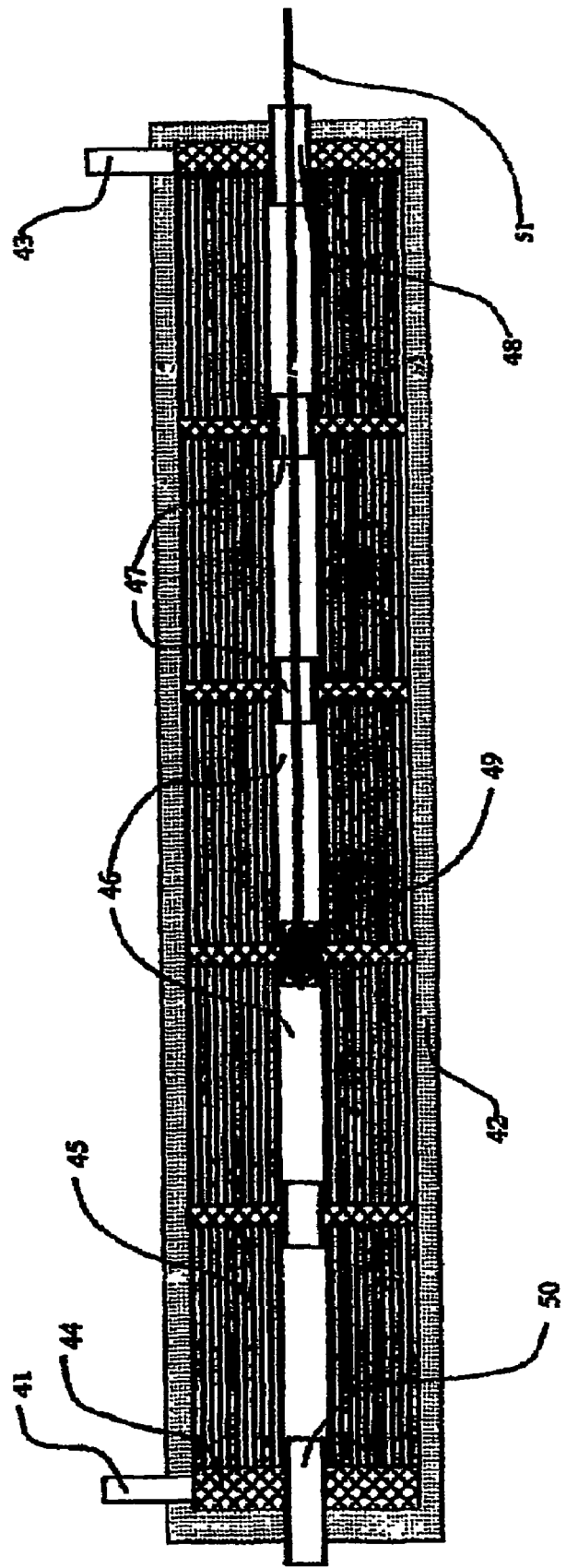
FIGS. 5A-5D are cutaway schematic views of embodiments employing a conventional vessel adapted for use in accordance with this invention by means of a permeate stream plug, valve or flow restrictor.
Figure 5B:
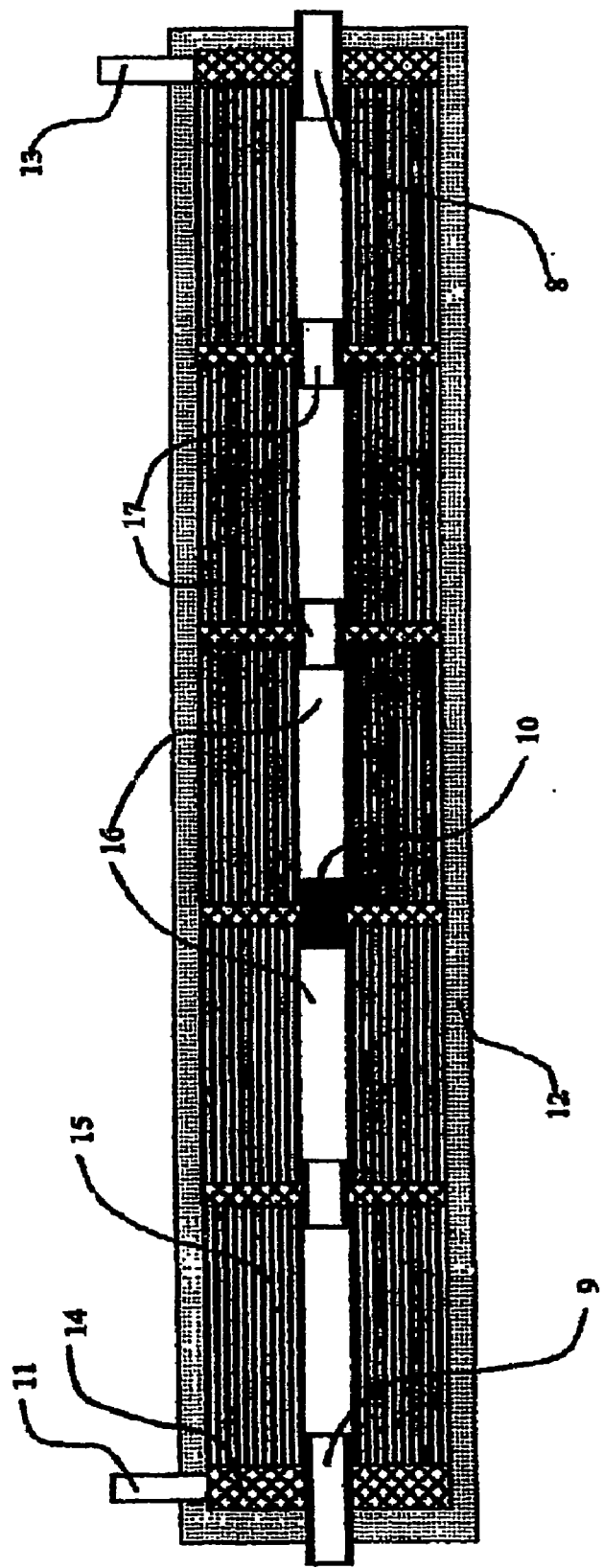
Figure 5C:
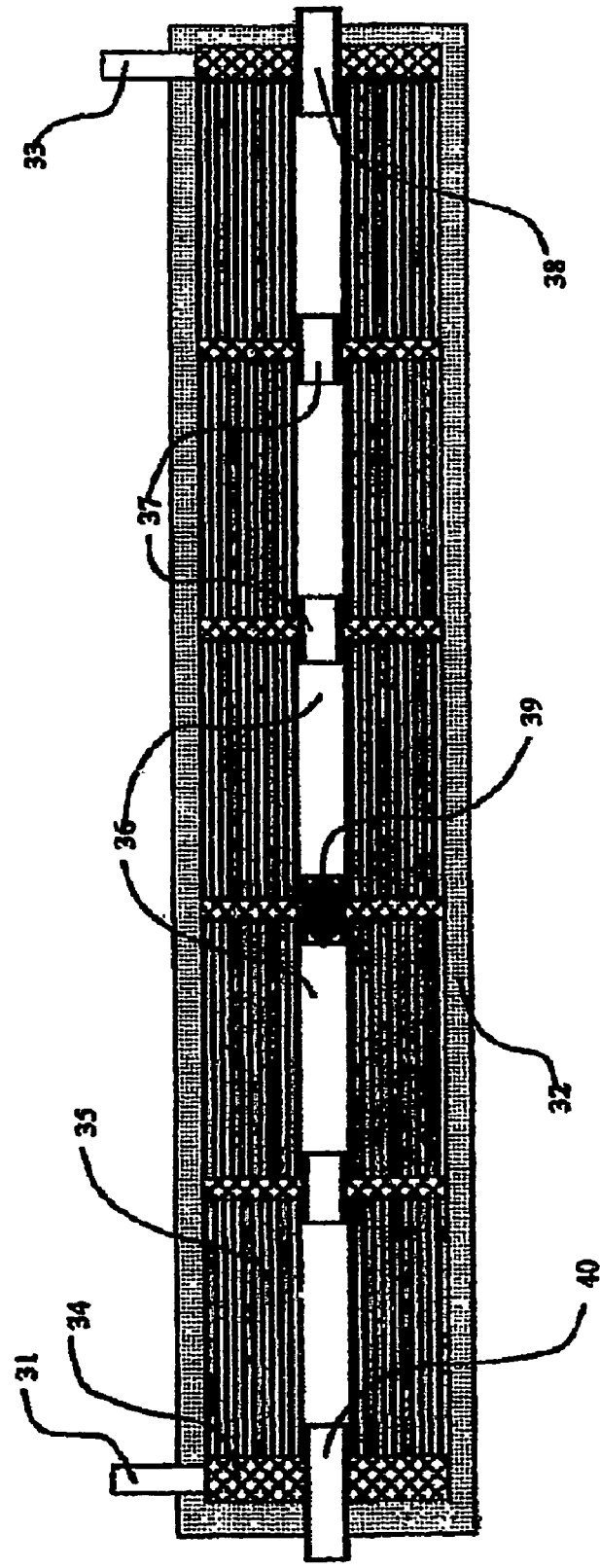

This may be effected in one embodiment of a different aspect of the invention by adapting a conventional pressure vessel construction, i.e., one designed for end-to-end feed flow. According to this aspect of the invention, as shown in FIG. 5A, a tapered plug or flow restrictor 49 with a maximum diameter equal to or less than the internal diameter of permeate tubes 46 and element stub connectors 47 is positioned or positionable at any point along the permeate line in a pressure vessel. By increasing upstream permeate back pressure to a value greater than the downstream permeate back pressure, said tapered plug or flow restrictor 49 can be moved further downstream in the pressure vessel 42 in which it is contained; and, correspondingly, by increasing downstream permeate back pressure to a value greater than the upstream permeate back pressure, said tapered plug or flow restrictor 49 can be moved further upstream in the pressure vessel 42 in which it is contained. In such way the split between the two permeates can be varied and controlled. The control of the position of tapered plug or flow restrictor 49 may be manual or automated. Automation of positioning of tapered plug or flow restrictor 49 can easily be accomplished by measuring the flow rate of upstream permeate and concentration(s) of one or more chemical species or other pertinent value(s) (i.e., conductivity, resistivity, etc.) in the upstream permeate, and measuring the flow rate of the further processed downstream permeate and concentration(s) of one or more chemical species or other pertinent value(s) (i.e., conductivity, resistivity, etc.) in the further processed downstream permeate, preferably providing such information in the form of signals to a control system which is capable of calculating concentration(s) of chemical species or other pertinent value(s) (i.e., conductivity, resistivity, etc.) in the product and controlling pro- cess equipment (i.e., pumps and valves) so that flow rates of untreated upstream permeate and further processed downstream permeate are adjusted to produce a product stream having a concentration of chemical species or other pertinent value(s) within a predetermined or specified range. Systems may also be implemented having a fixed obstruction such as a cartridge end plug FIG. 5B) or a stub connector plug (FIG. 5C) defining the permeate branching node.

Figure 5D:
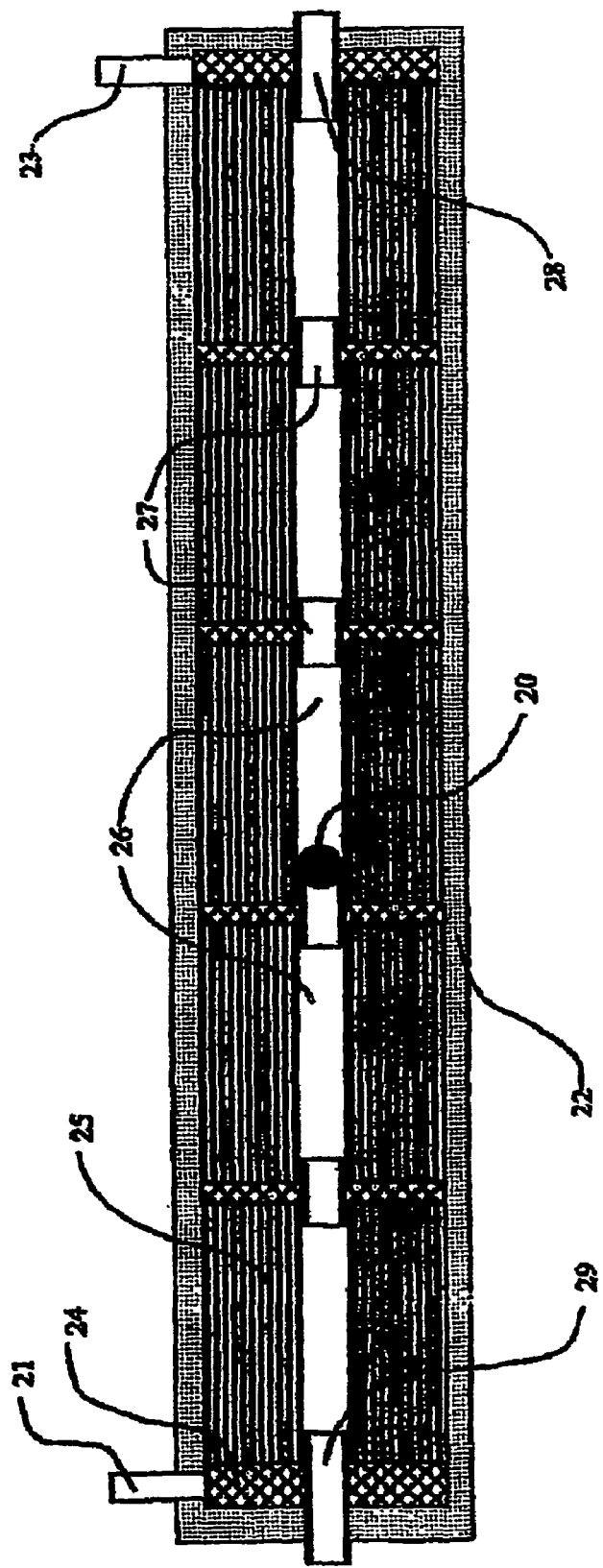

Another embodiment of this type is shown in FIG. 5D, wherein a branch divider ball or spherical element 20 can be moved between two filtration element connectors 27 so that the upstream permeate can be taken from a number of elements varying by one element. Hydraulic back pressure of the two permeate streams is controlled (e.g., by a valve in one permeate outlet) to move the position of the branch divider ball 20 in the permeate tube 26. In this embodiment ball 20 is of smaller diameter than permeate tube 26, but of a larger diameter than the internal diameters of RO stub connectors 27, so that it can only move between the ends of a single cartridge, in the illustrated example the middle cartridge in a five-cartridge vessel. By increasing upstream permeate back pressure to a value greater than the downstream permeate back pressure, ball 20 can be moved to the downstream end of the element in which it is contained; and, by increasing downstream permeate back pressure to a value greater than the upstream permeate, ball 20 can be moved to the upstream end of the element in which it is contained. In such way the split between the front end and the back end permeates can be varied by one RO element, allowing a range of different quality and relative quantity for the two streams. In a related embodiment, the obstruction, ball 20, may be omitted altogether, and the downstream permeate output may be varied by simply controlling the back pressure of the downstream permeate outlet line by a gate or other valve positioned in a line outside of the vessel.

In addition to providing branched permeate flows by adapting a conventional pressure vessel, the invention may operate with both a side entry vessel and an internal restrictor or flow divider. This configuration provides an enhanced range of flux/quality values for the two permeate streams. FIG. 5 illustrates a system 300 embodying this aspect of the invention. As shown in FIG. 5, a vessel 310 having a side entry port 315 and two opposite end ports 325a, 325b accommodates a plurality of cartridges having permeate tubes 317 interconnected by stub connectors 319 to collectively form a central permeate passage (like tube 22 of the device of FIG. 4), connecting via suitable end connectors and/or spacer structures 321 to respective permeate outlets 320a, 320b. A control element 330 resides in the permeate passage, positioned such that permeate entering the passage on the right side flows to the right end permeate outlet 320b, and permeate entering the tube via the left branch of cartridges flows to the left end permeate outlet 320a. The control element 330 may be solid or may have an opening, and may be sized and configured such that it completely blocks permeate flow between the two sides, or so that it partially obstructs or modulates the amount of permeate that may pass. The control element may be fixedly fitted into one of the stub connector assemblies 319 (or into a suitably prepared stub connector assembly) at the time of vessel assembly, or its position may be set or controlled by a control assembly, such as a fixed rod or manual- or servo-movable rod, as illustrated by rod 332. (Hydraulic seals are preferably used about such rod, but are omitted for clarity in the drawing.) When a movable control rod is provided, apportionment of the two permeates may be dynamically changed in accordance with a control regimen, based on detected or scheduled changes, for example of temperature or other feed stream characteristic.

Advantageously, by having a port 315 for the feed water located away from an end of the pressure vessel, and by providing a permeate divider body 330 in this manner, the vessel 310 is able to simultaneously tailor the volume and the quality of two permeate output streams over a wide range. It may therefore be set to operate with enhanced efficiency when conditions change, or may be incorporated into a pre-assembled subassembly—a complete bank or skid—that may be adapted to different systems, including multistage or multipass systems, each optimized for a completely different feed stock or that are set to produce several distinct permeate outputs. It can permit a single skid to be simply reset, without reconfiguring plumbing, for use in different locations. It may also permit several complete systems of substantially identical cost and component layout to constitute a "standard design" that undergoes only minor modifications, such as position of the control body 330, direction of cartridge loading or the like, for several completely different tasks, such as a brackish-to-potable water plant or a waste water reclamation plant, or for use in complete plants having different stages, bypass or treatment lines.

In these embodiments, it is not necessary that the port 315 be located at the center of the vessel 310. Indeed, where it is desired to produce two different quality or quantity permeate streams, the provision of a side-entry but non-centered port in conjunction with a control element 330 offers several distinct advantages.

Figure 6A:
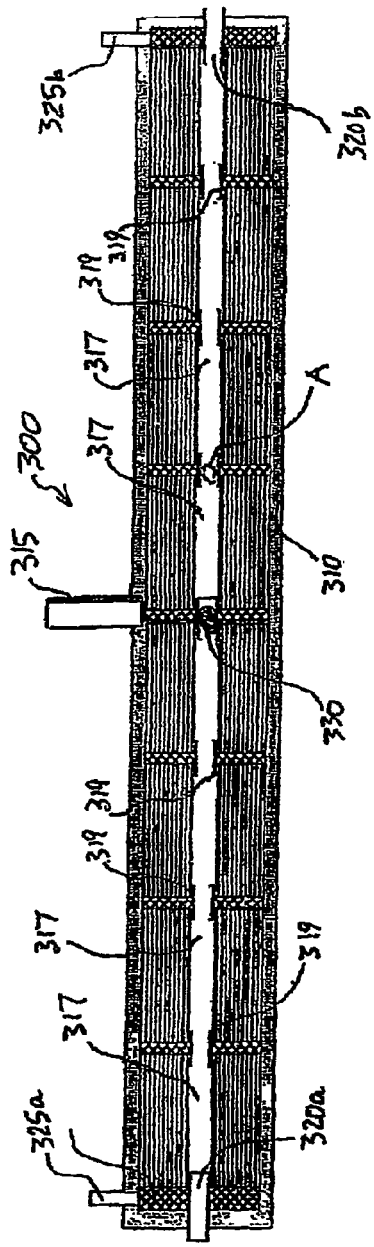
FIGS. 6A-6C illustrate yet other embodiments of the invention having enhanced utility in staged and other treatment systems in accordance with the invention.

FIG. 6A illustrates an eight-cartridge vessel with a side entry port at its center and having a flow dividing control element 330 also centrally positioned at the port area. This vessel operates, as described above for the vessel of FIG. 3, to provide essentially a double flux of front-end quality permeate comparable to that of two four-element vessels, but at lower vessel cost. However, by moving the flow divider 330 off-center to one side, such as to position "A" illustrated in phantom in FIG. 6A, different apportionments and qualities of permeate are obtained. In that case, the permeate flow from the left side of the vessel would be collected from five cartridges, of which two are in a high-flux, higher feed pressure "first cartridge" position immediately adjacent the entry port, while the remaining three cartridges providing the left hand side permeate flow, and all three of the right hand side cartridges providing permeate flow, each derive from a chain of three downstream cartridges having a permeate yield and quality typical of cartridges 24 of a chain. The left side permeate flow would thus have a higher volume, and generally higher quality permeate; this better permeate is collectively referred to, in the context of this embodiment of invention, as the "upstream" permeate.

The apportionment achieved by this aspect of the invention may be further extended, and particular choices of permeate yield and quality may be further optimized, by providing a side port at a non-centered intermediate position along the vessel, in conjunction with a flow divider or control such as restrictor assembly 330 and control rod 332 of FIG. 5. Two embodiments of such a side-entry offset-restrictor construction are illustrated by the vessel system 410 shown in FIGS. 6B and 6C.

Figures 6B, 6C:
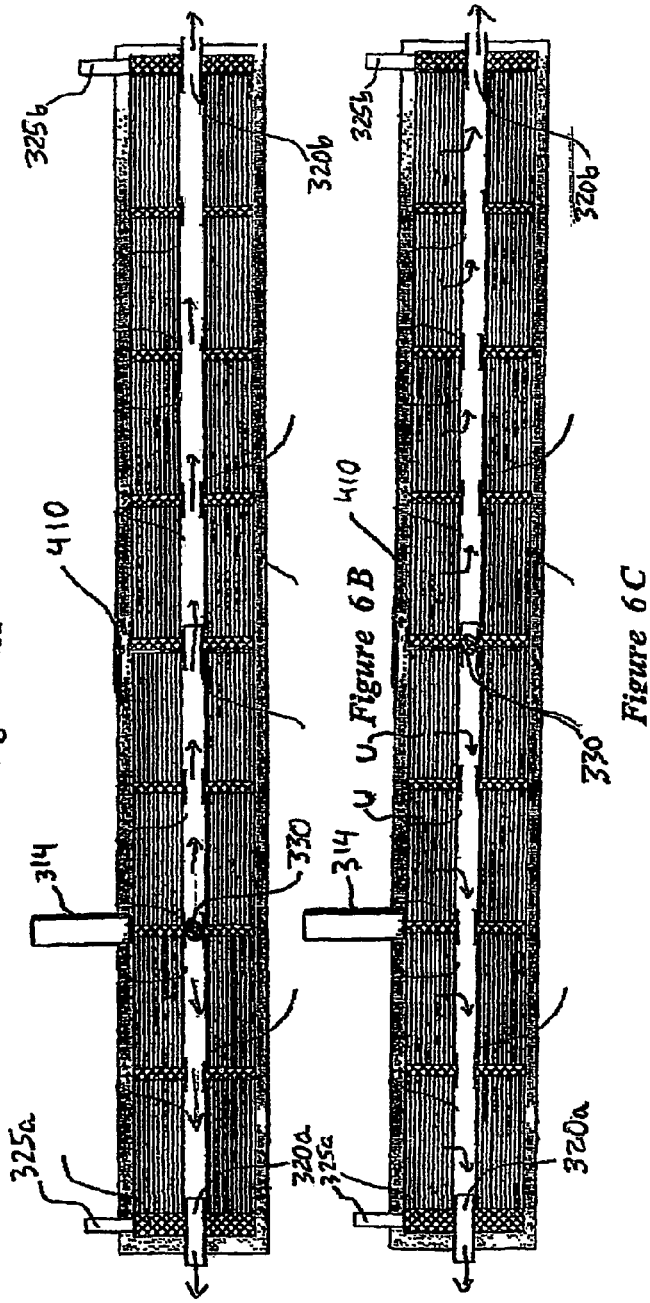

As shown in FIG. 6B, an eight-cartridge side-entry vessel 410 of the invention has first and second reject ports 325a, 325b at its respective ends and a side-entry feed port 314 that is positioned off-center at a position two cartridge lengths (e.g., one-quarter) down its length. With the flow divider (or plug or restrictor, when a fixed arrangement is used) 330 positioned directly at the entry port 314, the vessel operates like two smaller but unequal conventional vessels in parallel, operating as a conventional two-cartridge vessel feeding the left permeate outlet 320a, and as a conventional six-cartridge vessel feeding the right permeate outlet 320b. The operation in this regard may produce a divided product with two streams somewhat comparable to that of the above-cited U.S. Pat. No. 4,046,685, and the particular permeate yields and qualities may be calculated, for a particular membrane, based upon the modeling software provided by the membrane manufacturer, or may be estimated from prior experience with these conventional vessels used with comparable feeds. However, advantageously, by setting the control valve/restrictor 330 offset from the non-centered inlet 314, the range of achievable permeate parameters is greatly extended, and may be simply changed in response to changes in feed water composition or temperature, or in response to change in product water specifications or intended use.

Thus, as shown in FIG. 6C, if the divider/restrictor element 330 is a fully blocking element and is offset from the inlet to be positioned at the center of the eight-element vessel, then the left end permeate outlet 320a receives permeate from the four left-end cartridges in an arrangement substantially equivalent to two parallel strings of two cartridges each, centrally fed by port 314, while the right side permeate outlet 320b receives the permeate from a chain of four cartridges that are fed as a series string by the lower pressure and more concentrated reject flow from the two cartridges (labeled U in FIG. 6B) upstream of the divider 330. The permeate yield and quality at port 320a is thus enhanced, while the yield and quality from port 320b both decrease, and correspond approximately to that which would normally be obtained from only the downstream elements 3-6 of a six-element chain of filter cartridges. Thus, the asymmetric configuration directs the upstream permeate from both sides of the port to one outlet, and directs a reduced quantity of downstream permeate to the other outlet. Depending on the quality of the feed stream (seawater, brackish or fresh water), and its intended application, the high quality permeate may be useful directly as the intended product, or may be directed to a treatment plant bypass and be blended with another output to form the final product, or may undergo relatively simple further processing, such as second pass RO, deionization, electrodialysis or electrodeionization. The lesser quality permeate output from port 320b may, on the other hand, be returned to the feed stream to increase recovery, be treated in a different treatment unit or stage to enhance its quality, or be otherwise used or treated. Advantageously, however, the number of series-connected vessels, and consequently the pressure drop, is reduced, allowing increased flexibility of overall system design. Staged systems may avoid the use of an interstage pump, or may use a small booster for only one of the permeate streams, or may employ a first stage bypass to achieve a target quality with increased yield. For both streams, any later stage processing may be carried out in smaller treatment units specifically sized for and appropriate to their water quality, thus allowing more cost effective plant design and water treatment. As applied to RO filter systems, the systems of the invention may be applied to economically attain a required level of treatment for components in the feed that are poorly rejected by the RO membrane, or, when recovery of such components is required, may be applied to enhance recovery or concentrate the desired components.

Figure 7:
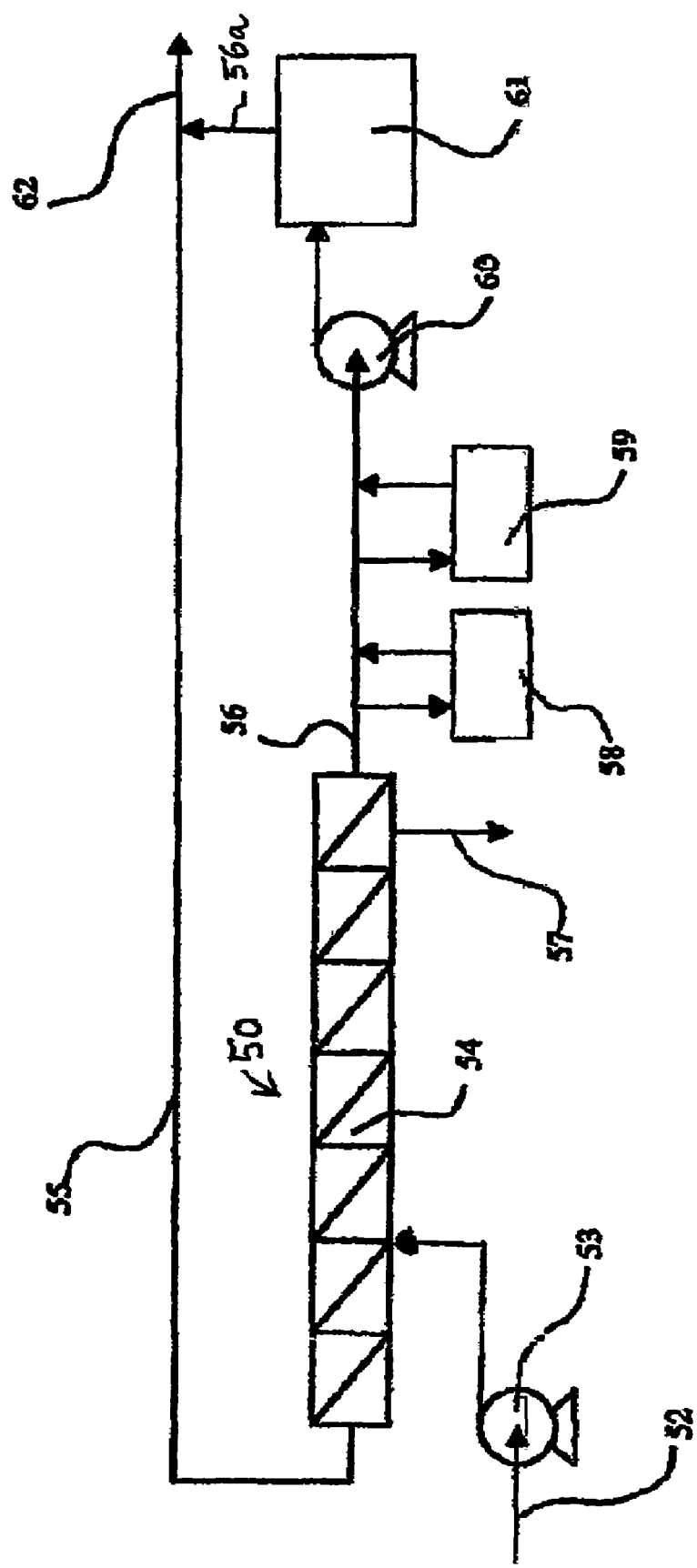
FIG. 7 is a simplified flow diagram of a treatment system incorporating a branched flow filtration apparatus in accordance with the invention.

By way of Example, a system for treating aqueous fluid may be configured as schematically shown in FIG. 7 using an RO vessel or bank of vessels in accordance with the present invention to desalt a sea water feed 52 after it has undergone pretreatment such as filtration, microfiltration, or ultrafiltration. Boron concentration in sea water may be around 4.3 milligrams per liter (ppm). Such boron is usually only weakly ionized, and is not rejected by RO membranes to the same degree as more highly charged ions. The pretreated sea water stream 52 is fed under pressure by pump 53 to one or more RO pressure vessels 50, each containing seven RO elements 54 in hydraulic series, producing front end and downstream permeate streams 55, 56 respectively, and brine reject stream 57. Boron concentration in permeate from the first two upstream elements for one common RO membrane averages 0.54 ppm, and the permeate yield from the first two upstream elements averages about forty percent of the total feed flow. Boron concentration in permeate from the remaining five elements is higher, averaging about 0.71 ppm in the downstream permeate flow 56. This flow may be subject to various further steps in additional treatment units 58, 59, 61 to further reduce its boron content. The further processing may include processes such as ion exchange, pH adjustment and an additional RO stage, or other treatment. Illustratively, further processing of the permeate from downstream elements by means of boron specific ion exchange resin may reduce the boron concentration of the treated downstream permeate stream 56a to less than 0.1 ppm. The system of FIG. 7 places the permeate stream 55 from the first two upstream elements in a bypass, further treats the permeate stream 56, and blends the treated permeate stream 56a with the bypass stream, forming a product water 62 with boron concentration less than 0.22 ppm, suitable for drinking water and even for many boron-restricted agricultural applications. If the specified product boron concentration were higher—e.g., 0.40 ppm—then the RO streams could be apportioned by suitable movable valve, output line back pressure restrictor, or side entry pressure vessel, all as previously described, such that permeate from fewer downstream elements formed the stream 56, reducing the flow diverted to the additional treatment processes. In that case, even smaller downstream treatment units would be required, further reducing plant or operating costs.

In the above descriptions, the side entry port has been generally described as a feed water inlet, and the two end ports as brine or reject outlets. However, the feed directions may in some circumstances be interchanged, with the center or side-entry port 105 (FIG. 3), 215 (FIG. 4), 315 (FIGS. 5 and 6A) or 314 (FIGS. 6B and 6C) serving as the reject outlet and brine end ports serving as feed inlets. In that case the ports may be dimensioned accordingly, or the pressure in the reject outlet and/or permeate lines adjusted as appropriate, for such flows. The direction of chevron or other directional seals, and the orientations in which cartridges are loaded or removed from the vessels may then also be modified, mutatis mutandis, from those described above, as appropriate. In the embodiments having an internal permeate tube valve, restriction or obstruction.

It may sometimes also be desirable to allow a probe tube to be inserted down the permeate passage for the full length of the vessel. This may be necessary, for example, to take longitudinally-displaced water samples in order to detect the presence of a malfunctioning (typically clogged or a torn) filter cartridge. In that case, the valve, restriction or obstruction is preferably configured to at least temporarily allow passage of such a probe therethrough. In addition to the flow-branching restrictors and obstructers as shown in FIGS. 5-10, permeate flows, or permeation conditions, may be controlled by positioning a pressure relief valve in the stub connector of one or more filter cartridge permeate tubes. Such a fixed pressure drop valve assures that the cartridge experiences a set level of back pressure and tends to thus uniformize the quantity and quality of permeate that passes in the branch upstream of the valve. Valved restrictors also allow a stepped adjustment of the retentate flow and filter characteristics of the downstream cartridges.

Aspects of the invention may also be applied to individual filter cartridges in addition to strings or chains of cartridges to produce plural permeate streams of different quality, and restrictors as described above may be implemented with various other mechanisms. They may also be implemented within a single cartridge (rather than a lengthy string of plural discrete cartridges), taking advantage of the gradient of velocity, concentration and trans-membrane flux that occurs along the length of a single cartridge. Such single filtration cartridge embodiments may be useful for a smaller (e.g., laboratory scale or small process) system, or for a food-industry system in which a single-cartridge or otherwise simplified assembly is employed to facilitate frequent disassembly, cleaning or sterilization. Embodiments having a single cartridge with an internal flow divider assembly may also advantageously be used for new systems having a non-standard RO cartridge form, such as a cartridge forty or more centimeters in diameter and one or two meters in length that has a capacity, by itself sufficient for the intended treatment plant output. Other embodiments of the invention may provide three or more permeates of different quality from a single vessel, or even from a single filter cartridge.

FIGS. 8A-9B illustrate some of such further features. A single cartridge is shown, but it will be understood that the constructions illustrated may also be implemented in a chain of n cartridges. As shown in FIG. 8, movable hollow conduits (e.g., tubes or pipes) 8a and 9a pass respectively through seals or glands 81a and 81 in respective ones of the permeate outlets 8 and 9 at opposite ends of the pressure vessel (not numbered). The conduits 8a and 9a each extend to an intermediate position within the filter module(s), and the position of each may be independently adjusted to select the overall quality of permeate it receives. Thus, together with the output from the outlets 8, 9, one may obtain four separate and qualitatively different fractions of permeate. The embodiment of FIG. 8 may also be combined with the plugs or flow restrictors of FIGS. 2-6, 9 and 10. If desired, only one of the conduits 8a or 9a may be installed and/or used, thereby producing three distinct and controllable permeate streams from a single vessel or cartridge. When the feed/retentate flow is from a feed inlet at conduit 11 to an outlet at conduit 13, then the concentration of included matter or rejected species will be greater at retentate port 13 than at feed inlet 11, both in such retentate and in the juxtaposed permeates. That is, the concentration of such matter in the fluid channeled to the four permeate outlet ports will be increasing in order at the permeate outlets 9<9a<8a<8, provided the membranes in the element are of uniform composition. If the flow of retentate is in the opposite sense, that is from port 13 to port 11, then the order of concentrations in the four permeates will also be reversed. When FIG. 8 represents multiple elements placed in a string inside a single vessel, then the type of filter membrane (e.g., seawater RO, brackish water RO) may also be changed partway along the string, for example to increase recovery or to increase permeate quality along a portion of the path feeding one or more of the outlets 8, 8a, 9 or 9a.

In still another embodiment shown in FIGS. 9A and 9B, a mechanically deformable plug 82 is positioned over the ends of rods 84 and 85, and the rods may be mechanically moved to position the deformable plug 82 anywhere in the permeate manifold of the filter element or string of filter elements. In one embodiment, relative movement of the rods toward each other also deforms the plug 82, as illustrated by 82a in FIG.

9B, dividing the collected permeate into two portions or branch flows. Such relative movement may be accomplished, for example, by compressing the plug 82 between stops on the rods 84 and 85, by linear actuation, by screwing rod 85 into rod 84 (as shown), or by other suitable mechanism.

An alternate embodiment is illustrated in FIGS. 10A and 10B. In this embodiment, a movable, inflatable plug 83 is attached to a movable conduit 86 (e.g., a tube or pipe) that sealingly passes through a gland or gasket 81 in permeate effluent conduit 9. By means of pneumatic or hydraulic pressure (for example with air or ultrapure water, respectively, as an inflation medium) the inflatable body 83 (for example, an inflatable butyl rubber balloon) is enlarged to divide the central permeate manifold into two predeterminable portions as shown by 83a in FIG. 9B. Systems of the invention may employ actuators that are operated by a suitable control system in response to one or more detected parameters to determine the relative flows from the various vessel permeate outlets. A movable conduit similar to one of the conduits 8a, 9a (FIG. 8) may also be used to sample permeate within a string of cartridges for diagnostic purposes, for example to detect a discrete drop in flow indicative of blockage, or an abrupt change in permeate quality as a function of linear position that indicates a blockage, a tear or the like. The movable permeate outlet may also be controlled to track a particular desired quality threshold for forming one output. This is especially useful when feed quality varies within an envelope that allows one to design specific treatment variations—for example in an estuarine RO plant where salinity varies periodically with ingress of tidal water.

The invention has been described above and illustrated primarily by describing segregation of permeate and more specifically segregation of permeate from spiral wound RO or similar cross flow membrane filtration units. However, the invention may be practiced with other membrane configurations, and may be applied to effectively segregate retentate (concentrate) in a membrane separation vessel, rather than branching the permeate, as will be understood by those skilled in the art. To illustrate one such example, a suitable vessel may be formed of a section of two inch porous (or perforated) pipe necked down to a section of one inch porous (or perforated) pipe. Each section in the vessel contains a rod or a pipe to form a thin annulus of a millimeter or so in thickness (optionally fitted with turbulence promoting screen), and separation membranes may be formed on the inside of the porous pipes, one type of membrane in the two inch pipe, and another type in the one inch pipe. This creates a rigid cross flow filtration assembly, in which, for example, the tube inside the two inch pipe (forming the flow annulus) is used to withdraw some retentate, leaving enough to feed the one inch membrane properly. The withdrawn retentate may be passed to waste, repressurized and recycled, acidified, filtered or otherwise processed. Such configuration is useful for treating particulate-containing fluids, such as for whole milk or skim milk intended for cheese making, and for treatment of fruit juice, and may advantageously be implemented in a mechanical structure that can be regularly disassembled, sterilized and cleaned.

The invention being thus disclosed and illustrative embodiments described, it will be understood by those skilled in the art that the invention may be practiced in diverse embodiments. Other variations and modifications for use in diverse processes and applications will occur to those skilled in the art, and all such variations and modifications are considered to be within the spirit and scope of the invention as described herein and defined by the claims appended hereto and equivalents thereof.

The invention claimed is:

1. In a cross flow filtration system of a type used for carrying out reverse osmosis (RO), where such system comprises one or more treatment units each consisting of an elongate pressure vessel having a first end, a second end, a single feed inlet, at least a brine outlet, and at least two separate permanent permeate outlets such that all of the permeate produced by the system during normal operation is withdrawn from the system through the permanent permeate outlets, and also wherein the elongate pressure vessel contains a plurality of filter modules, at least two of which are interconnected in a string along an axis of said pressure vessel such that the filter modules feed a common permeate collection manifold that extends axially through the pressure vessel and through the interconnected filter modules contained within the pressure vessel whereby pressurized feed provided at the feed inlet permeates under pressure through said filter modules and into said permeate collection manifold which is in fluid communication with a permeate outlet, the improvement comprising:

a treatment unit wherein a moveable flow divider in said permeate collection manifold disrupts the normal flow of permeate by establishing a fluidically separate manifold branch of the permeate collection manifold associated with each permanent permeate outlet, and further wherein said treatment unit is arranged such that at least one of said permanent permeate outlets receives permeate from at least two of said interconnected filter modules while all of the permeate produced by the system continues to be withdrawn from the system through the permanent permeate outlets.

2. A cross flow filtration system according to claim 1 comprising at least four filter modules and further wherein said feed inlet is located along the side of said elongate pressure vessel at an intermediate position along its length.

3. A cross flow filtration system according to claim 2 comprising two permanent permeate outlets, and wherein a flow divider apportions feed so as to produce a first permeate flow into a first manifold branch leading to a first of the two permanent permeate outlets from a first plurality of filter modules toward said first end of the pressure vessel and to produce a second permeate flow into a second manifold branch leading to a second of the two permanent permeate outlets from a second plurality of filter modules toward said second end of the pressure vessel.

4. A cross flow filtration system according to claim 3, further wherein said intermediate position of said feed inlet is substantially centered along said pressure vessel.

5. A cross flow filtration system according to claim 3, further wherein said intermediate position of said feed inlet is not substantially centered along the pressure vessel.

6. A cross flow filtration system according to claim 4, further wherein the flow divider is offset or offsetable from said intermediate position of said feed inlet.

7. A cross flow filtration system according to claim 5, further wherein the flow divider is offset or offsetable from said intermediate position of said feed inlet.

8. A cross flow filtration system according to claim 5, further wherein the flow divider is a divider element selected from among the group of divider elements consisting of a fixed or movable restrictor, a fixed or movable blocker, a pair of separate permeate inlet/collectors, an inflatable obstructer and a valve assembly.

9. Apparatus for treating at least one pressurized fluid mixture comprising at least first and second entities using a plurality of fluid mixture separation elements in a container therefor to produce at least a first fluid effluent from said container substantially enriched in said first entity, at least a second fluid effluent from said container substantially enriched in said second entity, and at least a third fluid effluent from said container also substantially enriched in said first entity, said apparatus comprising at least one combination of components selected from the following groups A, B and C:

Group A:
- A(1) one or more sources of a pressurized fluid mixture comprising at least first and second entities;
- A(2) a container having a plurality of fluid mixture separation elements in an interior region thereof, at least two of which are connected in a string along an axis of said container such that the separation elements feed a common collection manifold that extends through the interior region of the container and through said separation elements to collect a manifold fluid enriched in said first entity, said container including at least an inlet for said pressurized fluid mixture and separate permanent effluent outlets for recovering at least said first, second and third fluid effluents such that all of the effluent produced during normal operation is withdrawn from the apparatus through the permanent effluent outlets, each such fluid effluent characterized by having a ratio of said first entity to said second entity differing from the corresponding ratio in said pressurized fluid mixture, each said fluid mixture separation element characterized by having greater permeability for the first entity in said pressurized fluid mixture than for the second entity in said fluid mixture;
- A(3) one or more moveable fluid control elements in said common collection manifold within said container effective for disrupting the normal flow of permeate to produce said first and third fluid effluents from said manifold fluid;
- A(4) fluid inlet components for passing said pressurized fluid mixture into said inlet; and,
- A(5) fluid outlet components for recovering all of the first and third fluid effluents from said permanent effluent outlets;

Group B:
- B(1) one or more sources of a pressurized fluid mixture comprising at least first and second entities;
- B(2) a container having two or more fluid mixture separation elements in an interior region thereof, at least two of which are connected in a string along an axis of said container such that the separation elements feed a common collection manifold that extends through the interior region of the container and through said separation elements to collect a manifold fluid enriched in said first entity, said common collection manifold including a moveable fluid control element effective for disrupting the normal flow of permeate to produce said first and third fluid effluents from said manifold fluid, said container including at least an inlet for said pressurized fluid mixture and separate permanent effluent outlets for recovering at least said first and second fluid effluents and a third fluid effluent such that all of the effluent produced during normal operation is withdrawn from the apparatus through the permanent effluent outlets, each such fluid effluent having a ratio of said first entity to said second entity differing from the corresponding ratio in said pressurized fluid mixture, each said fluid mixture separation element characterized by having greater permeability for the first entity in said pressurized fluid mixture than for the second entity in said fluid mixture, further wherein at least some of said fluid mixture separation elements are positioned in said container with a single anti-bypass seal, such seal substantially preventing bypass fluid flow in a first direction around said fluid mixture separation elements having such seals but not substantially preventing bypass fluid flow in a second direction generally opposite to said first direction, and further wherein at least some of the remainder of said fluid mixture separation elements are positioned in said container with a single anti-bypass seal, such seal substantially preventing bypass fluid flow in said second direction around those remaining fluid mixture separation elements which have such a seal but not substantially preventing bypass fluid flow in said first direction;
- B(3) fluid inlet components for passing said pressurized fluid mixture into said inlet whereby said mixture flows through said fluid mixture separation elements without substantial bypass fluid flow around any of said fluid mixture separation elements having bypass seals; and,
- B(4) fluid outlet components for recovering all of the fluid effluents from said permanent effluent outlets, each said effluent having a ratio of first entity to second entity differing from the corresponding ratio in said pressurized fluid mixture; and, Group C:
- C(1) one or more sources of a pressurized fluid mixture containing at least first and second entities;
- C(2) a container having a plurality of fluid mixture separation elements in an interior region thereof, at least two of which are connected in a string along an axis of said container such that the separation elements feed a common collection manifold that extends through the interior region of the container and through said separation elements to collect a manifold fluid enriched in said first entity, said common collection manifold including a moveable fluid control element effective for disrupting the normal flow of permeate to produce said first and third fluid effluents from said manifold fluid, said container including at least an inlet for said pressurized fluid mixture and permanent effluent outlets for recovering said first and second fluid effluents and a third fluid effluent such that all of the effluent produced during normal operation is withdrawn from the apparatus through the permanent effluent outlets, each said fluid mixture separation element characterized by having greater permeability for a first entity in said pressurized fluid mixture than for a second entity in said fluid mixture, further wherein at least some of said fluid mixture separation elements are positioned in said container with an anti-bypass seal, such seal effective substantially to prevent bypass fluid flow in at least one fluid flow direction around said fluid mixture separation element having such seal, and further comprising a band effective to compress said seal, said band being readily removable after inserting said fluid mixture separation element in said container;
- C(3) fluid inlet components for passing said pressurized fluid mixture into said inlet whereby said fluid mixture flows through said fluid mixture separation elements without substantial bypass fluid flow around said fluid mixture separation elements having anti-bypass seals, whereby fluid effluents pass out of outlets, each such fluid effluent having a ratio of first entity to second entity differing from the corresponding ratio in said pressurized fluid mixture; and, C(4) fluid outlet components for recovering at least one of said fluid effluents.

10. Apparatus according to claim 9 further wherein a fluid mixture separation element comprises one or more membranes selected from the group consisting of:
reverse(d) osmosis membranes;
nanofiltration membranes;
ultrafiltration membranes;
microfiltration membranes;
hyperfiltration membranes;
gas separation membranes;
pervaporation membranes; and,
distillation membranes.

11. Apparatus according to claim 9 wherein said first entity is water and said second entity is a member selected from the group consisting of:
electrolytes;
hardness materials;
colloids including emulsified matter;
suspended matter;
microorganisms; and,
pyrogens.

12. Apparatus according to claim 9 wherein a fluid mixture separation element comprises spiral wound membranes.

13. Apparatus according to claim 9 wherein at least one of said fluid mixture separation elements in said container is characterized by having a greater permeability for said first entity than the permeability of another of said fluid mixture separation elements in said container relative to said first entity.

14. Apparatus according to claim 9 wherein said one or more of the fluid control elements within said container effective for varying the quantities of at least two of said at least three fluid effluents and/or for varying said ratio of first entity to second entity in at least two of said effluents includes one or more members selected from the group consisting of:
moveable dividers effective for dividing an effluent in said container into more than one effluent; and,
moveable outlets effective for dividing an effluent in said container into more than one effluent.

15. Apparatus according to claim 9 wherein said apparatus comprises the combination of components of Group A.

16. Apparatus according to claim 9 wherein said apparatus comprises the combination of components of Group B.

17. Apparatus according to claim 9 wherein said apparatus comprises the combination of components of Group C.

18. A cross flow filtration system according to claim 1 further wherein the pressure vessel includes a feed port located at an intermediate position along the pressure vessel, and a branching element or design that divides a feed into a first flow permeating through a first plurality of interconnected filter modules toward said first end of the pressure vessel and a second flow permeating through a second plurality of interconnected filter modules toward said second end of the pressure vessel, and first and second permanent permeate outlets positioned respectively at said first and second ends.

19. A cross flow filtration system according to claim 1 wherein the pressure vessel comprises a substantially cylindrical vessel having first and second vessel ends, and an axial lumen therebetween, and is sized for inserting therein a plurality of filter modules end to end in said lumen such that pressurized feed provided at an inlet of the pressure vessel permeates under pressure through the filter modules, the resulting permeate being collected by manifolds communicating with at least two permanent permeate outlets of the pressure vessel, and wherein the inlet is located at an intermediate position along the side of the pressure vessel, and further comprising a flow divider configured for being positioned proximate to the inlet such that modules placed in the pressure vessel abut either side of the flow divider to form two filter module branches extending to said first and said second vessel ends respectively.

20. A cross flow filtration system according to claim 19, further wherein said flow divider is permanently affixed in and fabricated as a structural brace in said vessel at the inlet position to separate adjacent filter modules such that flow of pressurized feed to the two branches is not constricted.

21. A cross flow filtration system according to claim 1 wherein a permeate collection manifold passes through both opposite ends of at least one of said filter modules of each treatment unit.

22. A cross flow filtration system according to claim 1 wherein said moveable flow restrictor of each treatment unit is positioned to establish separate permeate collection manifold branches, each of which collects permeate from the same number of interconnected filter modules.

23. A cross flow filtration system according to claim 1 wherein said moveable flow divider of each treatment unit is positioned to establish separate permeate collection manifold branches, one branch of which collects permeate from a greater number of interconnected filter modules than the other branch.

24. A cross flow filtration system according to claim 1 wherein a treatment unit further comprises unidirectional anti-bypass seals around one or more filter modules.

25. A cross flow filtration system according to claim 1 further comprising a manual control for manually positioning the flow divider.

26. A cross flow filtration system according to claim 1 further comprising an automated control for automated positioning of the flow divider.

27. A cross flow filtration system according to claim 1 wherein the moveable flow divider is a plug comprising a branch divider ball or spherical element such that the diameter of the divider ball or spherical element is smaller than the diameter of the permeate collection manifold but larger than the diameter of a connector element that connects adjacent portions of the manifold.

28. A cross flow filtration system according to claim 1 wherein said plurality of interconnected filter modules have membrane characteristics that change part-way along a string of interconnected filter modules to increase recovery and/or permeate quality along that portion of the filter module string.

29. A cross flow filtration system according to claim 4 wherein said flow divider is positioned at a different intermediate position along the pressure vessel than the feed inlet.

30. A cross flow filtration system according to claim 5 wherein said flow divider is positioned at the same intermediate position along the pressure vessel than the feed inlet.

31. A cross flow filtration system according to claim 5 wherein said flow divider is positioned at a different intermediate position along the pressure vessel than the feed inlet.

32. In a cross flow filtration system of a type used for carrying out reverse osmosis (RO), where such system comprises one or more treatment units each consisting of an elongate pressure vessel having a first end, a second end, a single feed inlet, at least a brine outlet, and at least two separate permeate outlets, and also including a plurality of filter modules, at least two of which are interconnected such that they feed a common permeate collection manifold, contained within the pressure vessel whereby pressurized feed provided at the feed inlet permeates under pressure through said filter modules and into said permeate collection manifold which is in fluid communication with a permeate outlet, the improvement comprising:

a treatment unit wherein a moveable flow restrictor in a permeate collection manifold establishes a fluidically separate permeate collection manifold branch associated with each permeate outlet, and further wherein said treatment unit is arranged such that at least one of said permeate outlets receives permeate from at least two of said interconnected filter modules, further wherein said moveable flow restrictor is a tapered plug with a maximum diameter equal to or less than the internal diameter of the permeate collection manifold.

33. A cross flow filtration system according to claim 32 further comprising a manual control for manually positioning the flow restrictor.

34. A cross flow filtration system according to claim 32 further comprising an automated control for automated positioning of the flow restrictor.

35. In a cross flow filtration system of a type used for carrying out reverse osmosis (RO), where such system comprises one or more treatment units each consisting of an elongate pressure vessel having a first end, a second end, a single feed inlet, at least a brine outlet, and at least two separate permeate outlets, and also including a plurality of filter modules, at least two of which are interconnected such that they feed a common permeate collection manifold, contained within the pressure vessel whereby pressurized feed provided at the feed inlet permeates under pressure through said filter modules and into said permeate collection manifold which is in fluid communication with a permeate outlet, the improvement comprising:

a treatment unit wherein a moveable flow restrictor in a permeate collection manifold establishes a fluidically separate permeate collection manifold branch associated with each permeate outlet, and further wherein said treatment unit is arranged such that at least one of said permeate outlets receives permeate from at least two of said interconnected filter modules, further wherein said moveable flow restrictor is a branch divider ball or spherical element.

36. A cross flow filtration system according to claim 35 further comprising a manual control for manually positioning the flow restrictor.

37. A cross flow filtration system according to claim 35 further comprising an automated control for automated positioning of the flow restrictor.

38. A cross flow filtration system according to claim 35 wherein the diameter of the divider ball is smaller than the diameter of the permeate collection manifold but larger than the diameter of a connector element that connects adjacent portions of the manifold.

39. Apparatus for treating at least one pressurized fluid mixture comprising at least first and second entities using a plurality of fluid mixture separation elements in a container therefor to produce at least a first fluid effluent from said container substantially enriched in said first entity and at least a second fluid effluent from said container substantially enriched in said second entity, said apparatus comprising at least one combination of components selected from the following groups A, B and C:

Group A:
A(1) one or more sources of a pressurized fluid mixture comprising at least first and second entities;
A(2) a container having a plurality of fluid mixture separation elements, at least two of which are connected such that they feed a common collection manifold that collects manifold fluid enriched in said first entity, said container including at least an inlet for said pressurized fluid mixture and separate outlets for recovering at least said first, second and third fluid effluents, each such fluid effluent characterized by having a ratio of said first entity to said second entity differing from the corresponding ratio in said pressurized fluid mixture, each said fluid mixture separation element characterized by having greater penetrability for the first entity in said pressurized fluid mixture than for the second entity in said fluid mixture;
A(3) one or more moveable fluid control elements consisting of a tapered plug with a maximum diameter equal to or less than the internal diameter of the common collection manifold or a branch divider ball or spherical element in said manifold within said container effective for producing said first and third fluid effluents from said manifold fluid;
A(4) one or more fluid inlet components for passing said pressurized fluid mixture into said inlet; and,
A(5) one or more fluid outlet components for recovering fluid effluents from said outlets;

Group B:
B(1) one or more sources of a pressurized fluid mixture comprising at least first and second entities;
B(2) a container having two or more fluid mixture separation elements, at least two of which are connected such that they feed a common collection manifold that collects manifold fluid enriched in said first entity, said manifold including a moveable fluid control element consisting of a tapered plug with a maximum diameter equal to or less than the internal diameter of the permeate collection manifold or a branch divider ball or spherical element effective for producing said first and third effluents from said manifold fluid, said container including at least an inlet for said pressurized fluid mixture and separate outlets for recovering at least said first and second fluid effluents and a third fluid effluent, each such fluid effluent having a ratio of said first entity to said second entity differing from the corresponding ratio in said pressurized fluid mixture, each said fluid mixture separation element characterized by having greater permeability for the first entity in said pressurized fluid mixture than for the second entity in said fluid mixture, further wherein at least some of said fluid mixture separation elements are positioned in said container with a single anti-bypass seal, such seal substantially preventing bypass fluid flow in a first direction around said fluid mixture separation elements having such seals but not substantially preventing bypass fluid flow in a second direction generally opposite to said first direction, and further wherein at least some of the remainder of said fluid mixture separation elements are positioned in said container with a single anti-bypass seal, such seal substantially preventing bypass fluid flow in said second direction around those remaining fluid mixture separation elements which have such a seal but not substantially preventing bypass fluid flow in said first direction;
B(3) one or more fluid inlet components for passing said pressurized fluid mixture into said inlet whereby said mixture flows through said fluid mixture separation elements without substantial bypass fluid flow around any of said fluid mixture separation elements having bypass seals; and, B(4) one or more fluid outlet components for recovering fluid effluents from said outlets, each said effluent having a ratio of first entity to second entity differing from the corresponding ratio in said pressurized fluid mixture; and, Group C:

C(1) one or more sources of a pressurized fluid mixture containing at least first and second entities;

C(2) a container having a plurality of fluid mixture separation elements, at least two of which are connected such that they feed a common collection manifold that collects manifold fluid enriched in said first entity, said manifold including a moveable fluid control element consisting of a tapered plug with a maximum diameter equal to or less than the internal diameter of the permeate collection manifold or a branch divider ball or spherical element effective for producing said first and third effluents from said manifold fluid, said container including at least an inlet for said pressurized fluid mixture and outlets for recovering said first and second fluid effluents and a third fluid effluent, each said fluid mixture separation element characterized by having greater permeability for a first entity in said pressurized fluid mixture than for a second entity in said fluid mixture, further wherein at least some of said fluid mixture separation elements are positioned in said container with an anti-bypass seal, such seal effective substantially to prevent bypass fluid flow in at least one fluid flow direction around said fluid mixture separation element having such seal, and further comprising a band effective to compress said seal, said band being readily removable after inserting said fluid mixture separation element in said container;

C(3) one or more fluid inlet components for passing said pressurized fluid mixture into said inlet whereby said fluid mixture flows through said fluid mixture separation elements without substantial bypass fluid flow around said fluid mixture separation elements having anti-bypass seals, whereby fluid effluents pass out of outlets, each such fluid effluent having a ratio of first entity to second entity differing from the corresponding ratio in said pressurized fluid mixture; and, C(4) one or more fluid outlet components for recovering at least one of said fluid effluents.

40. Apparatus according to claim 39 further wherein a fluid mixture separation element comprises one or more membranes selected from the group consisting of:

reverse(d) osmosis membranes;
nanofiltration membranes;
ultrafiltration membranes;
microfiltration membranes;
hyperfiltration membranes;
gas separation membranes;
pervaporation membranes; and,
distillation membranes.

41. Apparatus according to claim 39 wherein said first entity is water and said second entity is a member selected from the group consisting of:

electrolytes;
hardness materials;
colloids including emulsified matter;
suspended matter;
microorganisms; and,
pyrogens.

42. Apparatus according to claim 39 wherein a fluid mixture separation element comprises spiral wound membranes.

43. Apparatus according to claim 39 wherein at least one of said fluid mixture separation elements in said container is characterized by having a greater permeability for said first entity than the permeability of another of said fluid mixture separation elements in said container relative to said first entity.

44. Apparatus according to claim 39 wherein said apparatus comprises the combination of components of Group A.

45. Apparatus according to claim 39 wherein said apparatus comprises the combination of components of Group B.

46. Apparatus according to claim 39 wherein said apparatus comprises the combination of components of Group C.

47. Apparatus according to claim 39 further comprising a manual control for manually positioning the fluid control element.

48. Apparatus according to claim 39 further comprising an automated control for automated positioning of the fluid control element.

49. Apparatus according to claim 48 wherein the diameter of the divider ball is smaller than the diameter of the permeate collection manifold but larger than the diameter of a connector element that connects adjacent portions of the manifold.

50. Apparatus according to claim 1 wherein said moveable flow divider is selected from the group consisting of a plug, a baffle and a valve.

51. Apparatus according to claim 9 wherein said moveable fluid control element is selected from the group consisting of a plug, a baffle and a valve.

* * * * *